(12) United States Patent
Escowitz

(10) Patent No.: US 11,123,935 B2
(45) Date of Patent: Sep. 21, 2021

(54) ALIGNED FIBER REINFORCED MOLDING

(71) Applicant: ARRIS COMPOSITES LLC, Moraga, CA (US)

(72) Inventor: Ethan Escowitz, Moraga, CA (US)

(73) Assignee: ARRIS COMPOSITES LLC, Moraga, CA (US)

( * ) Notice: Subject to any disclaimer, the term of this patent is extended or adjusted under 35 U.S.C. 154(b) by 0 days.

(21) Appl. No.: 17/002,950

(22) Filed: Aug. 26, 2020

(65) Prior Publication Data

US 2020/0384706 A1  Dec. 10, 2020

Related U.S. Application Data

(60) Continuation of application No. 15/840,826, filed on Dec. 13, 2017, now Pat. No. 10,807,319, which is a division of application No. 15/612,720, filed on Jun. 2, 2017.

(51) Int. Cl.
| | | |
|---|---|---|
| *B29C 70/34* | (2006.01) | |
| *B29K 105/06* | (2006.01) | |
| *B29K 101/12* | (2006.01) | |
| *B29C 70/08* | (2006.01) | |

(52) U.S. Cl.
CPC ............ *B29C 70/345* (2013.01); *B29C 70/08* (2013.01); *B29K 2101/12* (2013.01); *B29K 2105/06* (2013.01)

(58) Field of Classification Search
CPC ........ B29C 70/34; B29C 70/345; B29C 70/88
See application file for complete search history.

(56) References Cited

U.S. PATENT DOCUMENTS

| | | |
|---|---|---|
| 2,414,125 A | 1/1947 | Rheinfrank |
| 2,626,804 A | 1/1953 | Robinson |
| 2,878,020 A | 3/1959 | Robinson |
| 2,880,080 A | 3/1959 | James et al. |
| 3,078,202 A | 2/1963 | Bellanca et al. |
| 3,138,507 A | 6/1964 | Wiltshire |
| 3,150,032 A | 9/1964 | Rubenstein |
| 3,271,917 A | 9/1966 | Rubenstein |
| 3,334,166 A | 8/1967 | Marzocchi |
| 3,641,230 A | 2/1972 | Jenks |
| 3,655,321 A | 4/1972 | Wolf |
| 3,655,862 A | 4/1972 | Dorschner |
| 3,655,863 A | 4/1972 | Andersen et al. |
| 3,658,748 A | 4/1972 | Andersen et al. |
| 3,684,645 A | 8/1972 | Temple et al. |
| 3,889,348 A | 6/1975 | Lemelson |

(Continued)

FOREIGN PATENT DOCUMENTS

FR  2951400 A1  4/2011

OTHER PUBLICATIONS

Non-Final Office Action for U.S. Appl. No. 15/612,720 dated Oct. 4, 2017, 16 pages.

(Continued)

*Primary Examiner* — Matthew J Daniels
*Assistant Examiner* — Andrew D Graham

(57) ABSTRACT

Methods and apparatus for additive manufactures of complex parts using co-aligned continuous fibers are disclosed. Filament subunits having complex shapes are fabricated and inserted into a mold cavity. The layup is compression molded to form a complex part having high tensile strength.

28 Claims, 11 Drawing Sheets

(56) References Cited

U.S. PATENT DOCUMENTS

| | | | |
|---|---|---|---|
| 4,029,838 A | 6/1977 | Chamis et al. | |
| 4,044,188 A | 8/1977 | Segal | |
| 4,339,490 A | 7/1982 | Yoshioka et al. | |
| 4,340,562 A | 7/1982 | Gross et al. | |
| 4,474,635 A | 10/1984 | Adams | |
| 4,526,735 A | 7/1985 | Norota et al. | |
| 4,804,427 A * | 2/1989 | Paul | B29C 70/50 156/180 |
| 4,935,279 A | 6/1990 | Perko et al. | |
| 5,066,536 A | 11/1991 | Cogswell et al. | |
| 5,076,601 A | 12/1991 | Duplessis | |
| 5,080,385 A | 1/1992 | Duplessis | |
| 5,085,928 A | 2/1992 | Krueger | |
| 5,152,856 A | 10/1992 | Thein et al. | |
| 5,294,461 A | 3/1994 | Ishida | |
| 5,298,318 A | 3/1994 | Soules et al. | |
| 5,401,154 A | 3/1995 | Sargent | |
| 5,405,683 A | 4/1995 | Sandusky et al. | |
| 5,413,738 A | 5/1995 | Lewis et al. | |
| 5,525,413 A | 6/1996 | Duarer et al. | |
| 5,573,813 A | 11/1996 | Custer | |
| 5,597,629 A | 1/1997 | Johnson | |
| 5,648,941 A | 7/1997 | King | |
| 5,753,164 A | 5/1998 | Ritchie et al. | |
| 5,961,288 A | 10/1999 | Legendre et al. | |
| 5,989,710 A | 11/1999 | Matsuo et al. | |
| 6,331,028 B1 | 12/2001 | O'Neill | |
| 6,821,613 B1 | 11/2004 | Kaegi et al. | |
| 7,169,343 B1 | 1/2007 | Mills et al. | |
| 7,846,366 B2 | 12/2010 | Iobst | |
| 8,424,805 B2 | 4/2013 | Smith | |
| 8,617,336 B2 | 12/2013 | Kawamura | |
| 8,993,084 B2 | 3/2015 | Griess et al. | |
| 2002/0056508 A1 | 5/2002 | Brandstrom | |
| 2002/0106469 A1 | 8/2002 | Fanucci et al. | |
| 2002/0155251 A1 | 10/2002 | Renault | |
| 2003/0104738 A1 | 6/2003 | Porter et al. | |
| 2003/0226328 A1 | 12/2003 | West et al. | |
| 2005/0058822 A1 | 3/2005 | Ittel | |
| 2006/0035548 A1 | 2/2006 | Goto et al. | |
| 2006/0073319 A1 | 4/2006 | Robertson et al. | |
| 2006/0165955 A1 | 7/2006 | Ruegg et al. | |
| 2007/0020431 A1 | 1/2007 | Nowacki et al. | |
| 2007/0243368 A1 | 10/2007 | Edwards | |
| 2008/0063864 A1 | 3/2008 | Aisenbrey | |
| 2008/0124513 A1 | 5/2008 | Eleazer et al. | |
| 2008/0166517 A1 | 7/2008 | Horne | |
| 2008/0260954 A1 | 10/2008 | Paton et al. | |
| 2010/0121463 A1 | 5/2010 | Toermaelae et al. | |
| 2010/0136278 A1 | 6/2010 | Cadd et al. | |
| 2010/0178495 A1 | 7/2010 | Taketa et al. | |
| 2010/0196671 A1 * | 8/2010 | Sorensen | B29C 70/088 428/174 |
| 2011/0097554 A1 | 4/2011 | Kehrl et al. | |
| 2011/0156305 A1 | 6/2011 | Lonsdorfer et al. | |
| 2012/0302118 A1 | 11/2012 | Kasuya et al. | |
| 2013/0082416 A1 | 4/2013 | Wakeman | |
| 2013/0108824 A1 | 5/2013 | Berger et al. | |
| 2013/0122763 A1 | 5/2013 | Fish et al. | |
| 2013/0130584 A1 | 5/2013 | Fujiwara et al. | |
| 2013/0134621 A1 | 5/2013 | Tsotsis et al. | |
| 2013/0149521 A1 | 6/2013 | Nelson et al. | |
| 2013/0189482 A1 | 7/2013 | Dequine | |
| 2013/0252497 A1 | 9/2013 | Schiebel et al. | |
| 2013/0337222 A1 | 12/2013 | Wilenski et al. | |
| 2014/0051310 A1 | 2/2014 | Kunal et al. | |
| 2014/0079908 A1 | 3/2014 | Kato et al. | |
| 2014/0178662 A1 | 6/2014 | Luo et al. | |
| 2014/0224410 A1 | 8/2014 | Millar et al. | |
| 2014/0232035 A1 | 8/2014 | Bheda | |
| 2014/0272417 A1 | 9/2014 | Zeidan | |
| 2014/0323004 A1 | 10/2014 | Mihara et al. | |
| 2014/0328963 A1 | 11/2014 | Mark et al. | |
| 2014/0335300 A1 | 11/2014 | Tsai | |
| 2015/0044419 A1 | 2/2015 | Carson et al. | |
| 2015/0151495 A1 | 6/2015 | Fisher | |
| 2015/0298443 A1 | 10/2015 | Hundley et al. | |
| 2015/0329993 A1 | 11/2015 | Grove-Nielsen | |
| 2016/0009034 A1 | 1/2016 | Moors | |
| 2016/0082696 A1 | 3/2016 | Krasnowski et al. | |
| 2016/0136870 A1 | 5/2016 | Thienel et al. | |
| 2016/0176122 A1 | 6/2016 | Anderson et al. | |
| 2016/0279899 A1 | 9/2016 | Cantwell et al. | |
| 2016/0355651 A1 | 12/2016 | Inoue | |
| 2017/0043539 A1 | 2/2017 | Madsen et al. | |
| 2017/0051438 A1 | 2/2017 | Davies | |
| 2017/0103826 A1 | 4/2017 | Al-Harthi et al. | |
| 2017/0114198 A1 | 4/2017 | Tudor et al. | |
| 2017/0151728 A1 | 6/2017 | Kunc et al. | |
| 2017/0182729 A1 | 6/2017 | Fox et al. | |
| 2017/0210035 A1 | 7/2017 | Fan et al. | |
| 2017/0225383 A1 | 8/2017 | Taneda et al. | |
| 2017/0254017 A1 | 9/2017 | Bertelo et al. | |
| 2017/0368812 A1 | 12/2017 | Palmieri et al. | |
| 2018/0030924 A1 | 2/2018 | Coppola et al. | |
| 2018/0036970 A1 | 2/2018 | Chmielewski et al. | |
| 2018/0186101 A1 | 7/2018 | Ikeda et al. | |
| 2019/0160715 A1 | 5/2019 | Mitsunaga et al. | |
| 2019/0177887 A1 | 6/2019 | Motohashi et al. | |
| 2019/0210303 A1 | 7/2019 | Jones | |

OTHER PUBLICATIONS

Final Office Action for U.S. Appl. No. 15/612,720, dated Jan. 25, 2018, 19 pages.
International Search Report and Written Opinion for Application No. PCT/US2018/035634, dated Oct. 16, 2018, 12 pages.
Thermoplastics vs Thermosetting Plastics, Recycled Plastics,RecycledPlastics.com, Copyright 2014, 2 pages.
Consolidated definition www.dictional.com/browse/consolidated , accessed Jan. 6, 2021.
Extended Search Report for EP Application No. 18810238.8 dated May 14, 2021, 13 pages.

* cited by examiner

ALIGNED FIBER REINFORCED MOLDING

This application is a continuation of U.S. application Ser. No. 15/840,826, filed on Dec. 13, 2017, now allowed, which is a divisional of U.S. application Ser. No. 15/612,720 filed on Jun. 2, 2017, which is incorporated by reference in its entirety.

FIELD

Methods of fabricating high strength complex parts are disclosed. Shaped subunits of fiber-reinforced filament are set in a molding cavity and compression molded to provide high strength complex parts. High strength parts can also be fabricated by drawing filer-reinforced filament and joining filament sections.

BACKGROUND

Automated fiber placement or filament winding is a known method of forming aligned fiber-containing parts using impregnated tapes of thermoplastic or thermosets. The process involves winding unidirectional tape onto a mandrel by means of a rotating drive. Fiber placement is controlled by a carriage that moves parallel to the axis of the rotating mandrel and controls fiber deposition with a pay-out eye. This process relies on tape tension as the tape is wrapped onto a mandrel to consolidate fibers and eliminate slack, voids and wrinkles. As a result of the deposition method, filament winding is suitable for making a limited selection of shapes, in particular tubular- and tank-shaped parts with convex surfaces.

Automated tape laying and three-dimensional printing/additive manufacturing are other known methods of forming aligned fiber-containing parts with impregnated tapes of thermoplastic or thermosets. These processes use automated robots or electromechanical motion systems to lay one or several layers of fiber tape or tows onto a mold or onto a build surface to produce a part or structure. Limitations exist for these layer-upon-layer deposition methods.

Compression molding is a known method of forming randomly aligned fiber parts with short sections of thermoplastic impregnated tape.

Resin transfer molding (RTM) is a known method of transferring a liquid polymer matrix into a complex mold where the polymer permeates in situ fiber reinforcement then hardens.

Methods of fabricating high strength complex thermoplastic parts are desired.

SUMMARY

According to the present invention, fiber-reinforced composite parts comprise one or more sections, wherein, at least one of the one or more sections comprises two or more aligned fiber portions; and each of the two or more aligned fiber portions independently comprises a plurality of co-aligned continuous fibers within a composition.

According to the present invention, method of fabricating a fiber-reinforced composite part comprise; providing one or more filament subunits, wherein, each of the one or more filament subunits independently comprises a linear filament subunit, a shaped filament subunit, or a combination thereof; and at least one of the one or more filament subunits comprises a first composition and a plurality of co-aligned continuous fibers; placing the one or more filament subunits into a mold cavity to form a layup; and compression molding the layup to provide a fiber-reinforced composite part.

According to the present invention, fiber-reinforced composite parts are fabricated according to the methods according to the present invention.

According to the present invention, methods of fabricating one or more shaped filament subunits, comprise: securing a section of each of one or more filaments; and shaping the one or more filament sections to provide one or more shaped filament subunits.

According to the present invention, shaped filament subunits are fabricated according to method of the present invention.

According to the present invention, filament subunit fabrication apparatus, comprise: a filament feeder configured to advance filament; securing device configured to secure and to manipulate a section of the advancing filament; a heating element configured to heat a portion of the secured filament section; and a shaping element configured to shape and to cool the heated portion of the filament section.

According to the present invention, methods of fabricating a part, comprise securing one or more filaments to a first anchor; and extending the one or more filaments in a direction away from the first anchor to provide the part.

BRIEF DESCRIPTION OF THE DRAWINGS

The drawings described herein are for illustration purposes only. The drawings are not intended to limit the scope of the present disclosure.

Figure 1A:
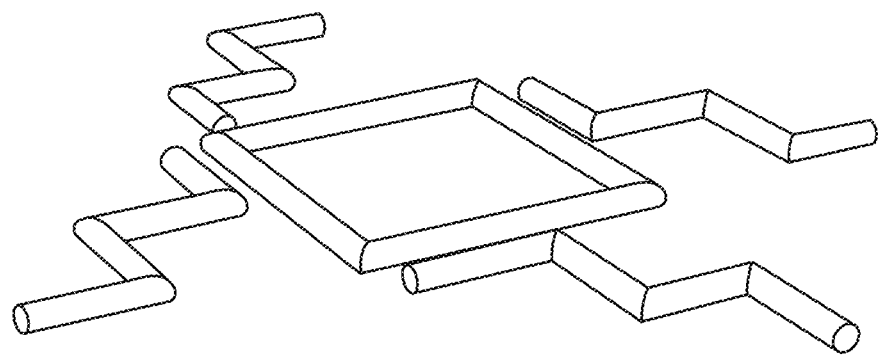
FIGS. 1A-1F show linear and shaped filaments subunits and the assembly of the filament subunits to form a layup for fabricating a part according to the present disclosure.

Reference is now made in detail to embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

A fiber-reinforced composite part can comprise one or more sections, where at least one of the one or more sections can comprise one or more aligned fiber portions; and each of the one or more aligned fiber portions independently comprises a plurality of co-aligned continuous fibers within a composition.

A section of a part refers to a portion of a part such as a segment of a part or a volume of a part. A portion refers to a region or volume of a section that comprises a different material than the material of another portion forming the section or that is derived from a different subunit that the sections formed from. As disclosed herein, a section can be fabricated by combining two or more subunits to form a section. Two or more portions of a section can then be said to be derived from each of the two or more respective subunits.

A section can have one portion or more than one portions. Each of the one or more portions can have the same material or can have a different material. The one or more portions can be apparent in a cross-section of a section.

A portion can comprise a composition. A composition can comprise a matrix material and one or more optional additives. A composition can also comprise aligned fiber and/or non-aligned fiber. However, when a composition is referred to as being the same as or different than another composition, it is the matrix material and the one or more optional additives that are being referred to. For example, a first composition and a second composition can both have the same or different co-aligned continuous fiber, but have a different matrix material and optional additives. The different matrix material and optional additives can comprise different materials and/or different amounts of the same materials.

A portion comprising co-aligned continuous fiber embedded within a matrix material is referred to as an aligned fiber portion.

A portion comprising non-aligned fiber embedded within a matrix material is referred to as a non-aligned fiber portion.

An aligned fiber portion can also contain non-aligned fiber.

A portion can comprise a matrix material without co-aligned continuous fiber and without non-aligned fiber and is referred to as a non-fiber portion.

One or more aligned fiber portions, non-aligned fiber portions, and/or non-fiber portions can be combined to form a section. In a cross-sectional view of a section, different regions or cross-sectional areas will show the characteristics of the various portions forming the section. For example, a left portion of the cross-section may show ends of co-aligned continuous fiber, an upper right portion can show randomly dispersed non-aligned fiber, and a lower right portion may not have any fiber.

At least one of the sections can comprise one or more aligned fiber portions, and in some embodiments, two or more aligned fiber portions. The two or more aligned fiber portions may be adjacent each other or may be separated from each other within a section. For example, two or more aligned fiber portions can be separated by non-aligned fiber portions and/or non-fiber portions.

The two or more aligned fiber portions can comprise a first aligned fiber portion, where the plurality of co-aligned continuous fibers comprises a first configuration; and a second aligned fiber portion, where the plurality of co-aligned continuous fibers comprises a second configuration. A configuration can refer to the number of fibers, the distribution of fibers within an aligned fiber portion, the type of fibers such as the dimensions of the fibers and/or the materials forming the fibers, or a combination of any of the foregoing.

For example, each of the first aligned fiber portion and the second aligned fiber portion can have a substantially uniform distribution of fibers or can have a substantially non-uniform distribution of fibers throughout the respective aligned fiber portions.

The two or more aligned fiber portions can comprise a first aligned fiber portion, where the plurality of co-aligned continuous fibers comprises a first configuration; and a second aligned fiber portion, where the plurality of co-aligned continuous fibers comprises a second configuration; wherein the first configuration is substantially different than the second configuration.

For example, in a first configuration the co-aligned continuous fibers can be uniformly distributed throughout the respective portion, and in a second configuration the co-aligned continuous fibers can be non-uniformly distributed throughout the portion. In a uniform distribution, any cross-sectional area of the aligned fiber portion can have about the same number of fibers and/or about the same area of fiber to area of the composition in which the fibers are embedded. In a non-uniform distribution there can be, for example, more or less fiber in a cross-sectional area than in another section. For example, in a non-uniform configuration there can be relatively more fiber in a lower area, an upper area, a side area, a center area or a peripheral area, compared to another area of the non-aligned fiber portion.

The two or more aligned fiber portions can comprise a first aligned fiber portion comprising a first composition; and a second aligned fiber portion comprising a second composition, wherein the first composition is substantially the same as the second composition. Compositions that are substantially the same will have the same matrix material, the same additives, and will have approximately the same amount of each of the matrix material and additives, respectively. The amount of matrix material and additives in terms of wt % refers to the wt % of the matrix material and/or additive based on the total weight of the matrix material and the additive. The wt % of aligned fiber and/or non-aligned fiber refers to the amount of fiber in a portion, based on the total weight of the portion including the fiber, the matrix material, and any optional additives. The amount of a constituent in terms of vol % can be determined in a similar manner.

The two or more aligned fiber portions can comprise a first aligned fiber portion comprising a first composition; and a second aligned fiber portion comprising a second composition, where the first composition is different than the second composition. For example, a first composition can have a polyethylene matrix material, and the second composition can have a polypropylene matrix material. As another example, a first composition can comprise light weight filler and the second composition can comprise a colorant. As another example, a first composition can comprise 2 wt % of an adhesion promoter and the second composition can comprise 5 wt % of an adhesion promoter, and otherwise have the same matrix materials and optional additives.

Each of the one or more sections of a composite part provided by the present disclosure can have one or more portions. For example, one section can have one portion, another section can have two portions, and another section can have three portions. Each of the portions in different sections can have the same composition or can have different compositions and each of the portions can have co-aligned continuous fiber, non-aligned fiber, or no fiber.

For example, the one or more sections can comprise a first section comprising a first aligned fiber portion, wherein the first aligned fiber portion comprises a plurality of co-aligned continuous fibers having a first configuration; and a second section comprising a second aligned fiber portion, wherein the second aligned fiber portion comprises a plurality of co-aligned continuous fibers having a second configuration; wherein the first configuration is substantially the same as the second configuration.

As another example, the one or more sections can comprise a first section comprising a first aligned fiber portion, wherein the first aligned fiber portion comprises a plurality of co-aligned continuous fibers having a first configuration; and a second section comprising a second aligned fiber portion, wherein the second aligned fiber portion comprises a plurality of co-aligned continuous fibers having a second configuration; wherein the first configuration is different than the second configuration.

Each section can comprise an aligned fiber portion, a non-aligned fiber portion, and/or a non-fiber portion. For example, a section can comprise one or more aligned fiber portions, one or more non-aligned fiber portions, and/or one or more non-fiber portions. A section cam contain only aligned fiber portions, only non-aligned fiber portions, or only non-fiber portions.

A section can contain one or more aligned fiber portions, one or more non-aligned fiber portions, and no non-fiber portions.

A section can contain no aligned fiber portion, one or more non-aligned fiber portions, and one or more non-fiber portions.

A section can contain one or more aligned fiber portions, no non-aligned fiber portions, and one or more non-fiber portions.

A section can contain one or more aligned fiber portions and one or more non-aligned fiber portions. The plurality of non-aligned fibers in the non-aligned fiber portion can be oriented orthogonal to the alignment of the co-aligned continuous fiber of the aligned fiber portion. The plurality of non-aligned fibers in the non-aligned fiber portion can be oriented parallel to the alignment of the co-aligned continuous fiber of the aligned fiber portion. The plurality of non-aligned fibers in the non-aligned fiber portion can be oriented at an angle with respect to the alignment of the co-aligned continuous fiber of the aligned fiber portion.

In aligned fiber portions comprising both co-aligned continuous fibers and non-aligned fibers, the non-aligned fibers can be entangled with the co-aligned continuous fibers. The non-aligned fibers can be uniformly distributed throughout the aligned fiber portion, or can be non-uniformly distributed throughout the aligned fiber portion.

In sections having two or more portions, each of the two or more portions can comprise an aligned fiber portion, a non-aligned fiber portion, or a non-fiber portion.

Each of the two or more aligned fiber portions independently can comprise a first matrix material; each of the one or more non-aligned fiber portions can comprise a second matrix material; and each of one or more non-fiber portions can comprise a third matrix material. The first matrix material and the second matrix material comprise the same matrix material; the first matrix material and the third matrix material comprise the same matrix material; the second matrix material and the third matrix material comprise the same matrix material; or each of the first matrix material, the second matrix material, and the third matrix material comprise the same matrix material In a section comprising portions having the same matrix material, the matrix material of one portion can be continuous with the matrix material of another portion having the same matrix material. In a continuous matrix material the matrix material from the two portions can form a single continuous material without any visually evident interface. A visually evident interface can result, for example, when there is an adhesion or bonding layer between the first and second portions.

In other sections, the first matrix material and the second matrix material can comprise a different matrix material; the first matrix material and the third matrix material can comprise a different matrix material; the second matrix material and the third matrix material can comprise a different matrix material; or the first matrix material, the second matrix material, and the third matrix material can comprise a different matrix material.

The one or more portions of a section can comprise the same composition or a different composition aside from whether the portions contain fiber or do not contain fiber. A composition will be the same as another composition if it comprises the same matrix material and the same additives, wherein the additives are present in the amount, such as the same wt % and/or vol %, based on the total weight or total volume, respectively, of the composition excluding the continuous and/or non-aligned fiber. Portions having the same composition can have a different wt % and/or vol % of continuous fiber and/or non-aligned fiber.

A section can comprise only one or more aligned fiber portions, only one or more non-aligned fiber portions, or only one or more non-fiber portions.

A section of a part can be linear, can have a bend, a curve, a complex shape, or a combination of any of the foregoing.

For a section having a bend, a bend can from an angle, for example, within a range of 5° to 179°, from 5° to 135°, or from 10° to 90°.

A section can incorporate one or more features to intended to provide a functional attribute. Examples of functional attributes include, thermal conduction, electrical conduction, sensing, interconnection, communications, shielding, and a combination of any of the foregoing.

A section can incorporate, for example, an embedded wire, an embedded electrical conductor, an embedded thermal conductor, an embedded waveguide, an embedded optical fiber, an embedded sensor, an embedded channel, an embedded tube, or a combination of any of the foregoing. These elements can be embedded within the bulk of the section and/or embedded within a wall of the section. These elements can be incorporated into the filament used to fabricate a fiber-reinforced part provided by the present disclosure and/or can be added to the part during assembly of the layup.

Parts provided by the present disclosure can be fabricated by compression molding one or more filaments. Thus, a fiber-reinforced composite part provided by the present disclosure can comprise any suitable matrix material that can be compression molded. Examples of suitable matrix materials include thermoplastics, thermosets, and ceramics, and combinations of any of the foregoing.

Examples of suitable thermoplastics include polyethylene, polypropylene, polyvinyl chloride, polystyrene, acrylonitrile butadiene styrene, styrene butadiene styrene, styrene acrylonitrile, polyamide, polycarbonate, polymethylmethacrylate, polyoxymethylene (polyacetals), polyphenylene oxide, polyphenylene ether, polyethylene terephthalate, polybutylene terephthalate, polyetherimide, polyphenylene sulfide, ethylene tetrafluoroethylene, polyether ether ketone, liquid crystal polymer, polytetrafluoroethylene, perfluoroalkoxy copolymer, fluorinated ethylene propylene, polyimide, polyamide, polybenzimidazole, polysulfone, polyaryletherketone, and thermoplastic polyurethane. A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

Examples of suitable thermosets include araldite, bakelites, epoxies, melamines, phenol/formaldehydes, polyesters, polyhexahydrotriazines, polyimides, polyisocyanates, polyureas, silicones, urea/formaldehydes, vinyl esters. phenolics, polycarbonates. Suitable thermosets can be prepared as a partially cured B-stage.

Examples of suitable ceramics include moldable ceramics

Aligned fiber portions of a part can comprise a plurality of co-aligned continuous fibers embedded within a composition. The plurality of co-aligned continuous fibers can be substantially uniformly distributed throughout the aligned fiber portion, or can be non-uniformly distributed throughout the aligned portion. Co-aligned continuous fibers refers to fiber embedded within a composition that has been derived from a pultrusion.

Each of the plurality of co-aligned continuous fiber can have a diameter, for example, within a range from 1 μm to 100 μm, from 1 μm to 90 μm, from 1 μm to 50 μm, from 5 μm to 40 μm, from 5 μm to 30 μm, from 10 μm to 30 μm, or from 1 μm to 20 μm.

The plurality of co-aligned continuous fiber can comprise, for example, from 5 fibers to 80,000 fibers, from 10 fibers to 80,000 fibers, from 100 fibers to 50,000 fibers, from 500 fibers to 40,000 fibers, or from 1,000 fibers to 20,000 fibers.

A plurality of co-aligned continuous fibers can comprise silica, glass, carbon nanotubes, carbon, polymer, metal, ceramic, natural fiber, synthetic fibers, or a combination of any of the foregoing. A plurality of co-aligned fiber can comprise carbon fibers.

A plurality of co-aligned continuous fiber can be in the form of a wire, a fabric, a ribbon, an extruded shape, a solid shape, a hollow shape, a perforated shape, a tube, a crystalline form, a non-crystalline form, an organic shape, a roving, a sliver, a tow, a bundle, a spiral, or a combination of any of the foregoing.

An aligned fiber portion can comprise, for example from 1 wt % to 70 wt % co-aligned continuous fibers, from 5 wt % to 70 wt %, from 5 wt % to 60 wt %, from 10 wt % to 50 wt %, from 10 wt % to 40 wt %, or from 15 wt % to 30 wt %, wherein wt % is based on the total weight of the aligned fiber portion.

An aligned fiber portion can comprise, for example from 1 vol % to 70 vol % co-aligned continuous fibers, from 5 vol % to 70 vol %, from 5 vol % to 60 vol %, from 10 vol % to 50 vol %, from 10 vol % to 40 vol %, or from 15 vol % to 30 vol %, wherein vol % is based on the total volume of the aligned fiber portion.

The plurality of non-aligned fibers can comprise, for example, an average length less than 10 cm, less than 8 cm, less than 6 cm, less than 4 cm, less than 2 cam, less than 1 cm, or less than 0.5 cm.

The plurality of non-aligned fiber can comprise, for example, an average length within a range from 0.5 cm 10 cm, from 0.5 cm to 8 cm, from 0.5 cm to 6 cm, from 0.5 cm to 4 cm, from 0.5 cm to 2 cm, or from 1 cm to 2 cm.

A non-aligned fiber portion can comprise, for example from 1 wt % to 70 wt % non-aligned fibers, from 5 wt % to 70 wt %, from 5 wt % to 60 wt %, from 10 wt % to 50 wt %, from 10 wt % to 40 wt %, or from 15 wt % to 30 wt %, where wt % is based on the total weight of the non-aligned fiber portion.

A non-aligned fiber portion can comprise, for example from 1 vol % to 70 vol % non-aligned fibers, from 5 vol % to 70 vol %, from 5 vol % to 60 vol %, from 10 vol % to 50 vol %, from 10 vol % to 40 vol %, or from 15 vol % to 30 vol %, where vol % is based on the total volume of the non-aligned fiber portion.

For aligned fiber portions comprising non-aligned fiber, the aligned fiber portion can comprise, for example, from 1 wt % to 70 wt % total fibers, from 5 wt % to 70 wt %, from 5 wt % to 60 wt %, from 10 wt % to 50 wt %, from 10 wt % to 40 wt %, or from 15 wt % to 30 wt %, where wt % is based on the total weight of the aligned fiber portion and the total fiber includes the co-aligned continuous fiber and the non-aligned fiber.

For aligned fiber portions comprising non-aligned fiber, the aligned fiber portion can comprise, for example from 1 vol % to 70 vol % total fibers, from vol % to 70 vol %, from 5 vol % to 60 vol %, from 10 vol % to 50 vol %, from 10 vol % to vol %, or from 15 vol % to 30 vol %, where vol % is based on the total volume of the aligned fiber portion and the total fiber includes the co-aligned continuous fiber and the non-aligned fiber.

An aligned portion comprising aligned fiber and non-aligned fiber can comprise, for example, less than 60 wt % non-aligned fiber, less than 50 wt %, less than 40 wt %, less than 30 wt %, less than 20 wt %, less than 10 wt % or less than 5 wt %, where wt % is based on the total weight of the aligned fiber and the non-aligned fiber. An aligned portion comprising aligned fiber and non-aligned fiber can comprise from 1 wt % to 60 wt % non-aligned fiber, from 1 wt % to 50 wt %, from 1 wt % to 40 wt %, from 1 wt % to 30 wt %, from 1 wt % to 20 wt % or from 1 wt % 10 wt %%, where wt % is based on the total weight of the aligned fiber and the non-aligned fiber.

An aligned portion comprising aligned fiber and non-aligned fiber can comprise, for example, less than 60 vol % non-aligned fiber, less than 50 vol %, less than 40 vol %, less than 30 vol %, less than 20 vol %, less than 10 vol % or less than 5 vol %, where vol % is based on the total volume of the aligned fiber and the non-aligned fiber. An aligned portion comprising aligned fiber and non-aligned fiber can comprise from 1 vol % to 60 vol % non-aligned fiber, from 1 vol % to 50 vol %, from 1 vol % to 40 vol %, from 1 vol % to 30 vol %, from 1 vol % to 20 vol % or from 1 vol % 10 vol %, where vol % is based on the total volume of the aligned fiber and the non-aligned fiber.

A plurality of non-aligned fibers can comprise chopped fibers, milled fibers, or a combination thereof. Non-aligned fibers can include a plurality of non-aligned continuous fibers. A plurality of non-aligned continuous fibers can include, for example, fiber bundles, fiber weaves, twisted fibers, or a combination of any of the foregoing. The non-aligned fibers can comprise any of the materials suitable for use as for co-aligned continuous fibers. Non-aligned fibers can comprise any of the form factors suitable for use as for co-aligned continuous fibers. A plurality of non-aligned fibers can be in the form of pellets.

To fabricate a part, one or more filaments can be combined in different sections to provide a layup, and the layup can be compression molded to provide the completed part.

An example of the process for assembling a layup is shown in FIGS. 1A-1F.

FIG. 1A shows examples of five (5) shaped filament subsections. Each of the shaped filament subsections can comprise substantially the same composition or one or more of the shaped filament subsections can comprise a different composition. Each composition comprises a matrix material. A composition can comprise fiber, which can include co-aligned continuous fibers, non-aligned fibers, or a combination thereof. A composition may not contain any co-aligned continuous fiber and non-aligned fibers. A composition may also contain various additives.

The compositions for each of the various filament subunits can be fabricated and selected to have certain properties depending on the location of the filament subunit within the layup. For example, sections of the part requiring high stiffness can comprise filament subunits comprising a plurality of co-aligned continuous fiber. Filament subunits located on the outside of a part may be selected to enhance solvent resistance, weatherability, aesthetics, and/or electrical and/or thermal conductivity. Other sections can be designed to increase, for example, tensile strength, compressive strength, flexural strength.

Figure 1B:
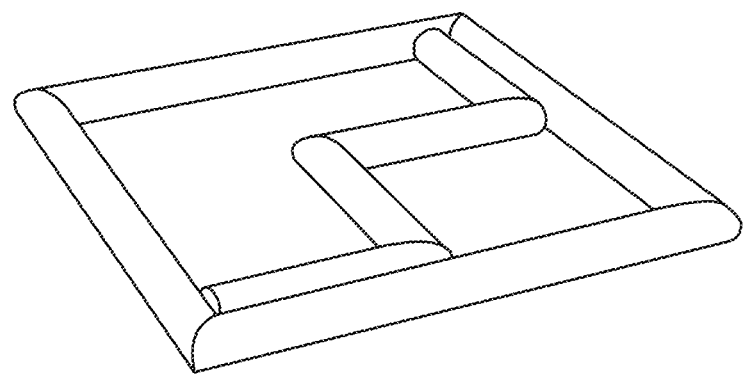
Figure 1C:
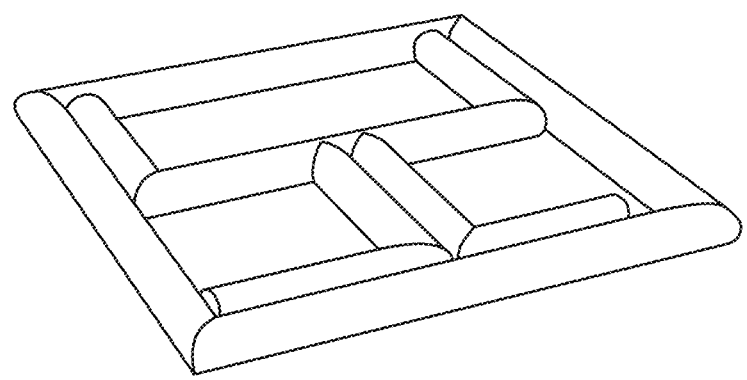
Figure 1D:
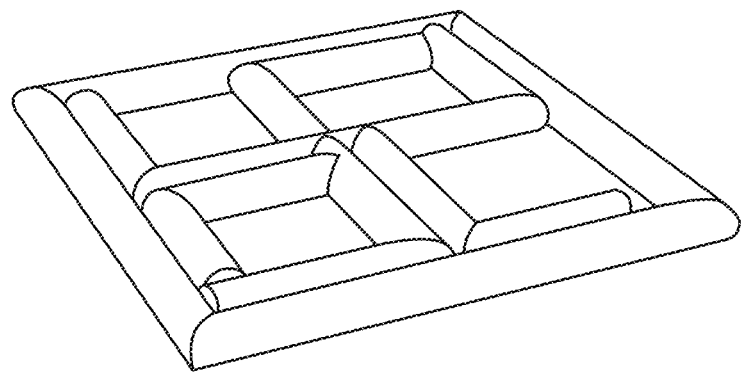
Figure 1E:
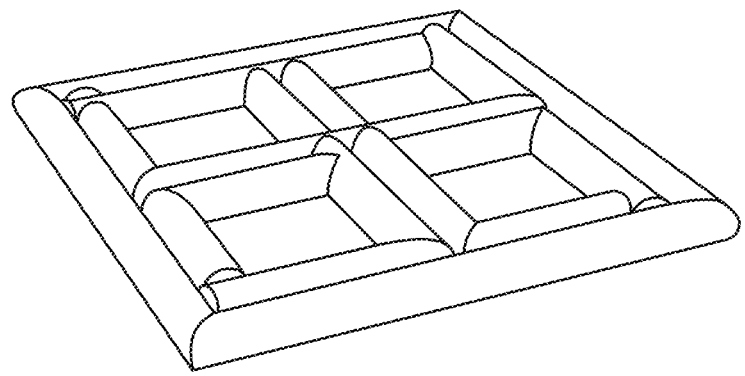

As shown in FIG. 1B the filament subunits can be assembled, layer by layer, to build the layup.

Figure 1F:
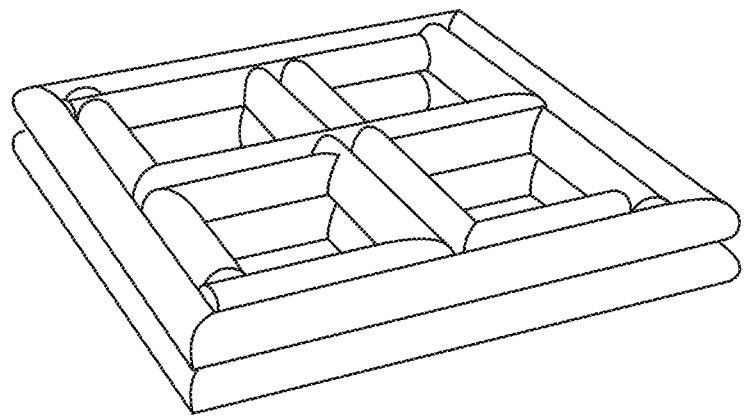

In FIGS. 1B-1E filament subunits are combined to form the various layers of the layup. An assembled layup is shown in FIG. 1F.

The layup of filament subunits can be combined in a mold cavity to assemble the layup.

The filament subunits can be combined in a tray or a cavity that matches the mold cavity to provide a layup that can be transferred to the mold cavity. The filament subunits of this intermediate layup can be held together, for example, with an adhesive.

Figure 2A:
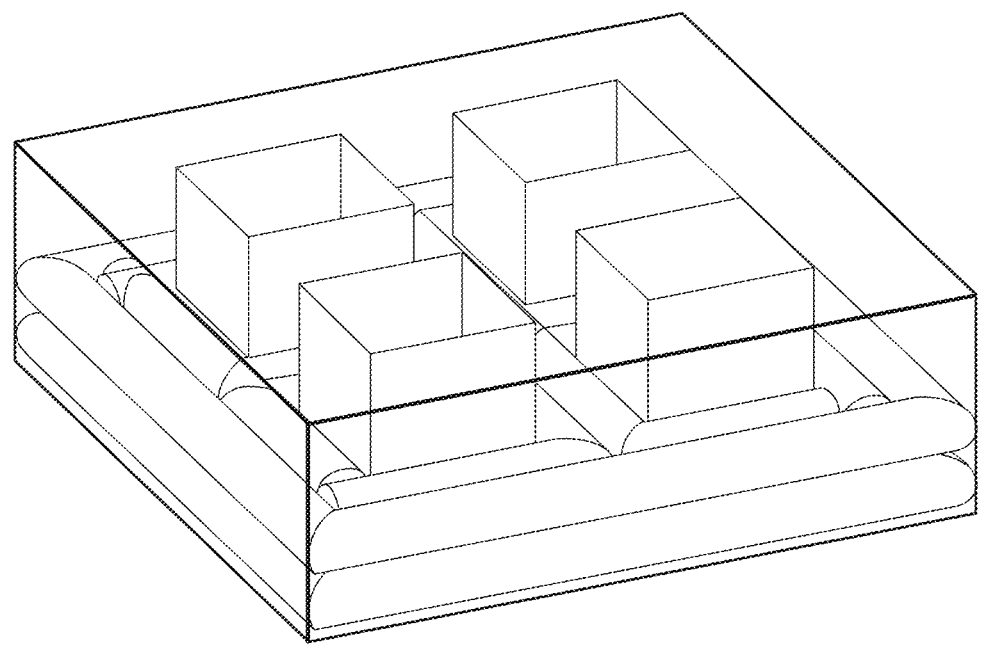
FIG. 2A shows the layup of FIG. 1F in a molding cavity.
Figure 2B:
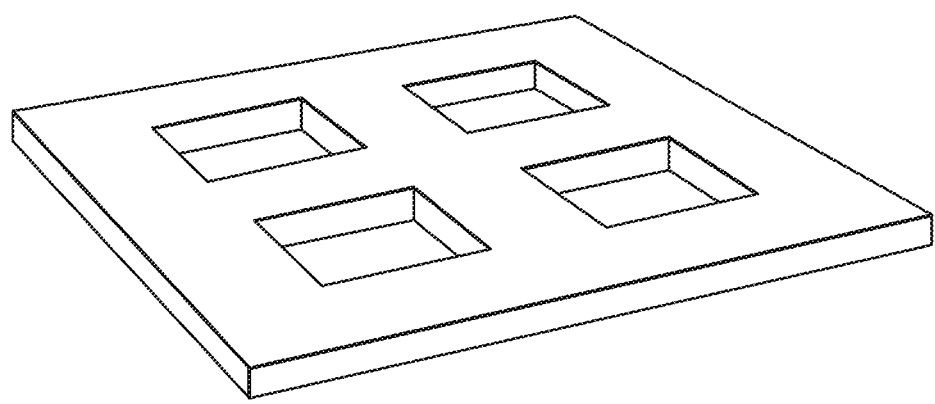
FIG. 2B shows a part fabricated by compression molding the layup shown in FIG. 6A.

FIG. 2A shows a view of a layup in a mold cavity. For a compression molded part, heat and pressure can be applied to cause the layup to flow and/or cure to form the finished part shown in FIG. 2B. For filaments comprising thermoplastics, the temperature can be increased above the melt temperature of the thermoplastic to cause the thermoplastic to flow to fill the cavity. For thermosets, the thermosets are provided as B-stage materials and the application of heat and pressure can cause the thermoset to flow to fill the cavity and complete the curing reaction. For ceramics, the ceramics can be provided as materials that will flow and fully curing under a combination of heat and pressure. The mold cavity can include gates to reduce, redistribute and/or increase the compositions at desired regions of a part.

Any suitable temperature and pressure can be used to compression mold the part, which is in part determined by whether a thermoplastic, a thermoset, or a ceramic is used and, for example, melt temperature of the thermoplastic, the thermoset chemistry, and the ceramic chemistry.

Figure 3A:
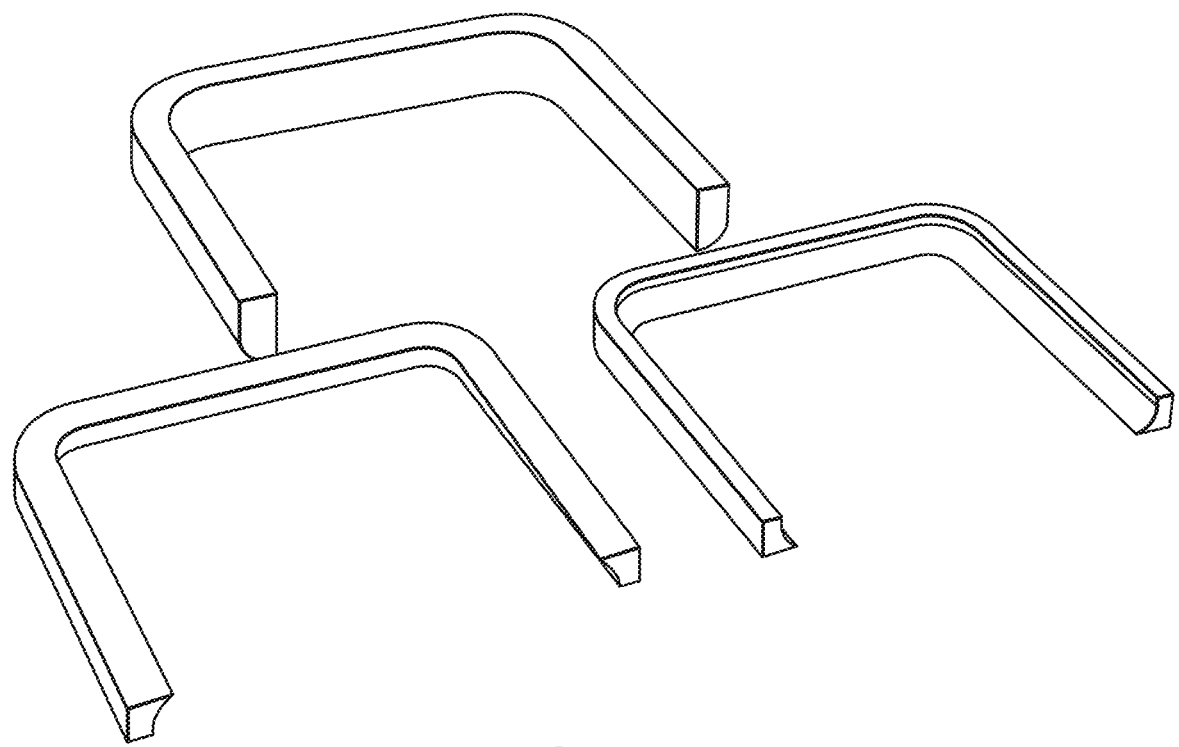
FIG. 3A shows three shaped filament subunits according to the present disclosure.
Figure 3B:
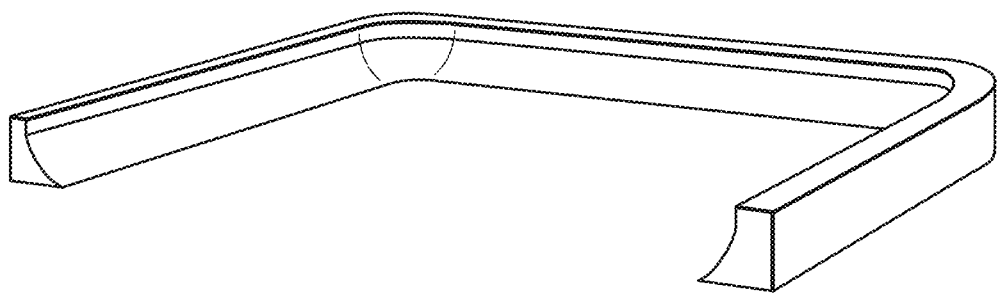
FIGS. 3B-3D shows steps in the assembly of the shaped filament subunits shown in FIG. 3A according to the present disclosure.
Figure 3C:
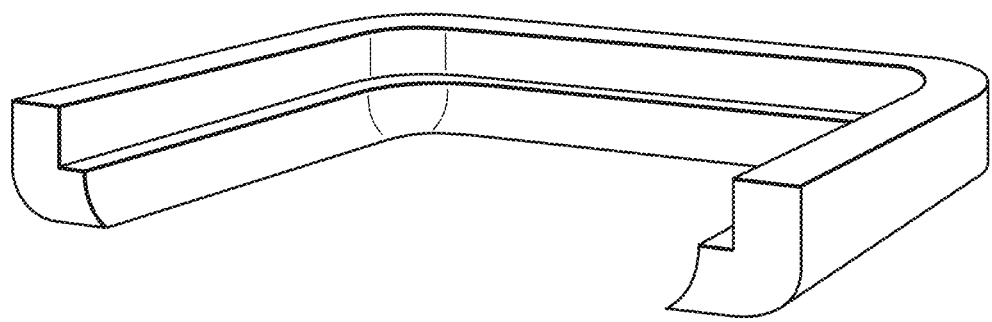
Figure 3D:
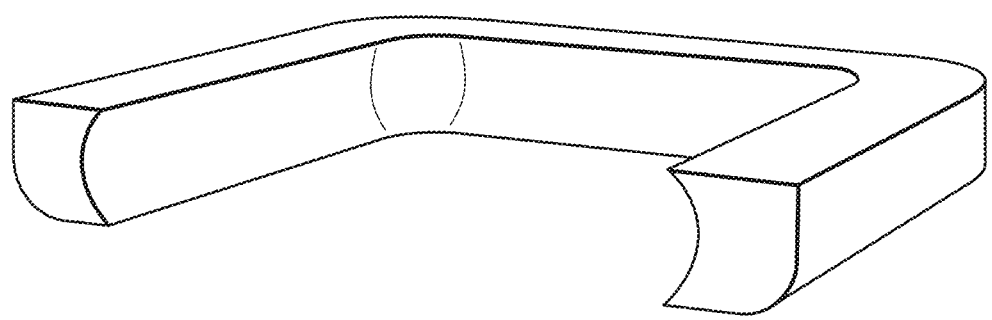
Figure 3E:
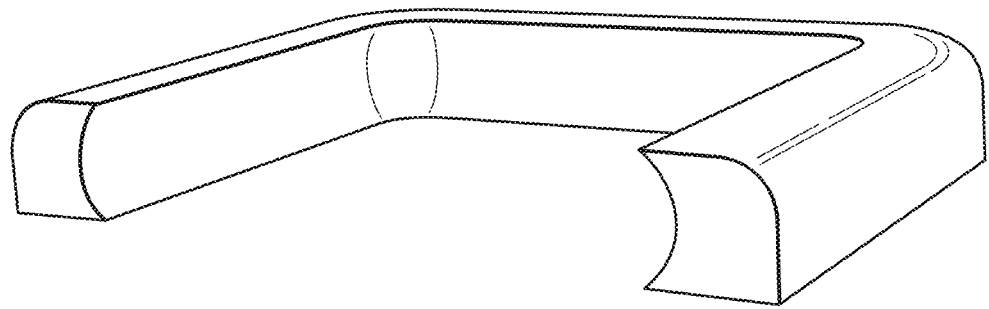
FIG. 3E shows a finished part fabricated by compression molding the layup of shaped filament subunits shown in FIG. 3D.

FIGS. 3A-3E show an example in which the part has a single U-shaped section formed from three (3) filament subunits. FIG. 3A shows views of the three subunits that have profiles configured to mate with each of the other subunits. Each of the subunits can be combined with each of the other subunits as shown in FIGS. 3B-3D. The layup shown in FIG. 3D can be compression molded to provide the fabricated part shown in FIG. 3E.

Figure 4A:
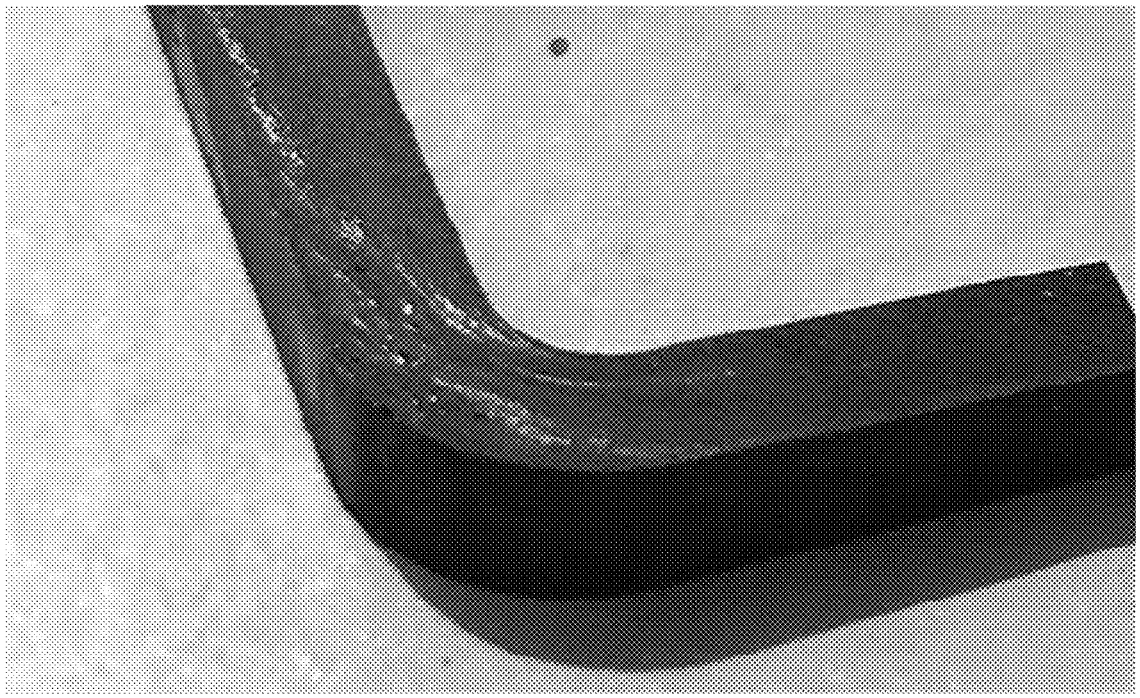
FIGS. 4A-4B show views of a bend in a shaped filament subunit according to the present disclosure.
Figure 4B:
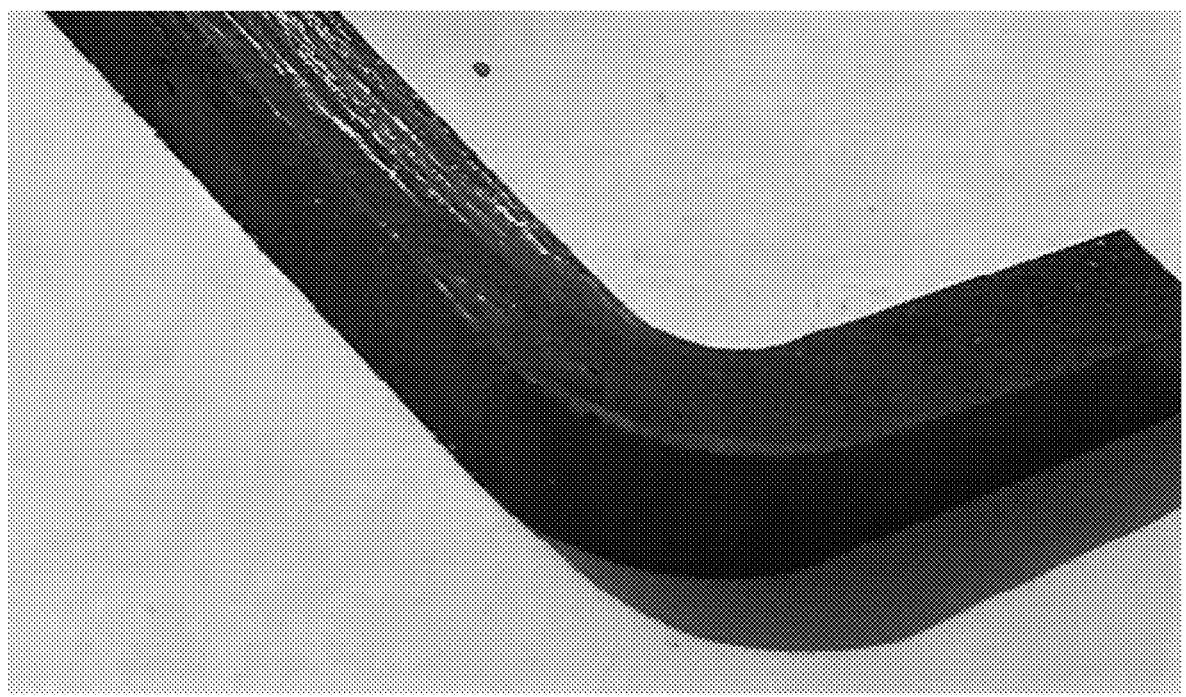

FIGS. 4A and 4B show photographs of a section of a part fabricated according to methods provided by the present disclosure. FIGS. 4A and 4B show a section having a bend and the orientation of co-aligned continuous fiber through the bend (FIG. 4A) and the orientation of co-aligned continuous fiber in a straight region of the section (FIG. 4B).

Methods of fabricating a fiber-reinforced composite part can comprise providing one or more filament subunits, where each of the one or more filament subunits independently comprises a linear filament subunit, a shaped filament subunit, or a combination thereof; and at least one of the one or more filament subunits comprises a first composition comprising a plurality of co-aligned continuous fibers; placing the one or more filament subunits into a mold cavity to form a layup; and compression molding the layup to provide a fiber-reinforced composite part.

A filament subunit includes a composition having matrix material and optional additives. A filament can include a plurality of co-aligned continuous fiber and/or aligned fiber. Thus, a filament can comprise a co-aligned continuous fiber filament, a aligned fiber filament, or a non-fiber filament. Each of the co-aligned continuous fiber filament, a non-aligned fiber filament, or a non-fiber filament can be used to form an aligned fiber portion, a non-aligned fiber portion, or a non-fiber portion of a section of a part, respectively.

Suitable matrix materials include materials that can be molded. Molding can involve applying heat and/or pressure. Examples of suitable matrix material includes thermoplastics, thermosets, and ceramics.

Suitable thermoplastics can be formed into filament subunits, can be assembled into a mold cavity, and can be formed into a part with application of heat and pressure. Suitable thermoplastics can have, for example, a melt temperature above room temperature.

Suitable thermosets are able to form a B-stage that facilities handling of the filament and assembly of filament subunits into a mold cavity. A completed part can be formed and the B-stage thermoset fully cured by applying heat and pressure to a layup comprising thermoset filament subunits.

Suitable ceramics are also able to form a B-stage that faceplates handling of the filament, assembly of the filament subunits into a mold cavity. The B-stage ceramic can be formed into a part by applying heat and pressure.

Filaments containing co-aligned continuous fiber can be formed, for example, by pultrusion.

Filaments containing non-aligned non-continuous fiber and filament submits without fiber can be formed, for example, using extrusion.

Filaments containing non-aligned continuous fiber can be formed, for example, using extrusion.

A coating can be applied to the exterior surface of a filament. A coating can be applied, for example, to the exterior surface for aesthetics, to enhance compatibility with other materials in a layup, to enhance adhesion to other materials in the layup, to facilitate molecular bonding to other materials in the layup, or a combination of any of the foregoing.

Figure 5A:
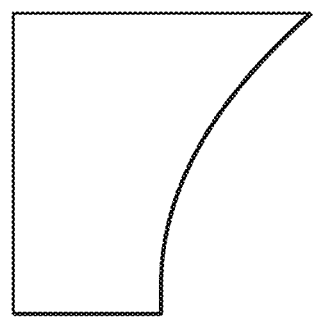
FIGS. 5A-5C show cross-sectional views of shaped filaments according to the present disclosure.
Figure 5B:
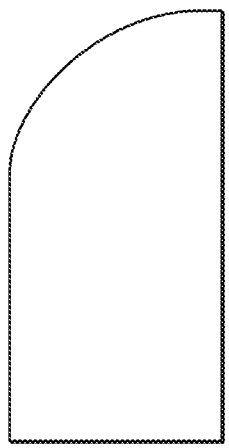
Figure 5C:
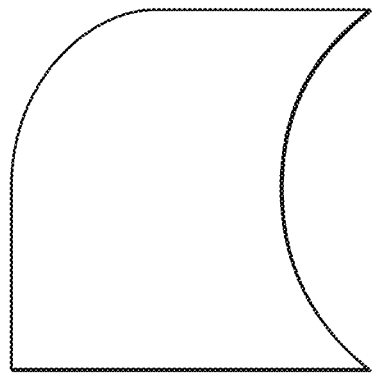

A filament can have any suitable cross-sectional profile. For example, a filament can have a simple circular or oval cross-sectional profile. A filament can also have a specific cross-sectional profile that, in combination with other filaments having particular cross-sections, can be combined to form a section of a part. An example in provided in FIGS. 5A-5C. FIG. 5A shows a cross-sectional profile of a first filament, and FIG. 5B shows a cross-sectional profile of a second filament. Two of the filaments shown in FIG. 5A can be combined with the filament shown in FIG. 5B to form a section having the cross-sectional profile shown in FIG. 5C. Heat and pressure can be applied the section shown in FIG. 5C to provide a completed part.

A filament can be formed into a filament subunit. A filament subunit is an element that, along with other filament subunits, can be combined to form a layup.

A part can include one or more sections. Filament subunits can be combined to form the one or more sections of a part. A section of a part may be formed from one or more filament subunits or portions of one or more filament subunits.

Methods of fabricating high strength complex parts can comprise providing a thermoplastic-impregnated fiber filament, forming the filament into a shaped subunit, assembling shaped subunits into a molding cavity to provide a layup, and compression molding the layup to provide a fiber-reinforced part. The methods can be adapted to fabricate high strength complex parts.

Thermoplastic-impregnated fiber filament can comprise fiber that is impregnated with a thermoplastic material.

Thermoplastic-impregnated fiber filament comprises continuous unidirectional fiber impregnated with a thermoplastic.

Thermoplastic-impregnated fiber filament can be formed by pultrusion, a process by which fiber is pulled under tension through a die and impregnated with a thermoplastic. In the process fiber can be homogeneously dispersed throughout the cross-sectional thickness of the pultrusion and fiber is aligned with the axis of the pultrusion. The pultrusion process can be adapted to any suitable shape or part thickness. Furthermore, pultrusion can be adapted to form parts having different compositions along the length or cross-section of a part. In other processes the fiber can comprise a bundle of fibers or several bundles of fibers. A bundle of fibers can be referred to as a tow. A tow is an untwisted bundle of continuous fibers. Thus, a thermoplastic-impregnated fiber filament can comprise one or more tows. A tow can comprise, for example from 5 to 80,000 fibers, 1,000 to 50,000 fibers, such as from 10 to 50,000 fibers, 1,000 to 40,000 fibers, from 1,000 to 30,000 fibers, from 1,000 to 20,000 fibers or from 1,000 to 5,000 fibers. A tow can have a diameter, for example, from about 0.5 mm to 3 mm Each fiber can have any suitable dimension, which can be, for example, from about 3 µm to 20 µm to 20 µm, or from 5 µm to 10 µm for carbon fiber. Glass fiber can have a diameter, for example, from 5 µm to 50 µm.

A filament can comprise a single fiber, multiple fibers, or a combination thereof dispersed throughout a cross-section of a filament. The multiple fibers can be arranged into one or more fiber bundles. A filament can comprise fibers that are separated or dispersed throughout the cross-sectional thickness of a tow such that for a given cross-sectional area the amount of fiber is about the same as another cross-sectional area. Multiple filaments can be, for example, braided, woven, twisted, or a combination thereof.

To form a thermoplastic-impregnated fiber filament, one or more tows can be impregnated with a thermoplastic using, for example, a pultrusion process. In a pultrusion process tow is pulled into a die under tension and thermoplastic is injected into the die. The pultruded part can be shaped, cooled, and cut to length to provide thermoplastic-impregnated fiber filament. Prior to entering the die, the fibers such as a tow can be coated and/or treated with a sizing. A sizing includes chemicals that bind the filaments together, reduces abrasion, facilitates impregnation with the thermoplastic resin, and acts as a coupling agent that enhances compatibility with the thermoplastic resin system.

During pultrusion the fibers forming a tow can become fully or partially separated from the bundle to become uniformly coated with thermoplastic.

The pultruded parts, such as a pultruded thermoplastic-impregnated fiber filament, can have any suitable shape and dimension for use fabricated a high strength part provided by the present disclosure. The pultruded parts can have fiber substantially uniformly dispersed throughout the cross-sectional thickness of the part, or can be homogeneously distributed. For example, the fiber can be substantially disposed in the cross-sectional center of a part or substantially on one or more sides of a part. The fiber can be oriented or substantially aligned with the long axis of a pultrusion.

A thermoplastic-impregnated fiber filament can have a shape and dimensions that provide for the desired properties in the compression molded part, that facilitate layup in a mold cavity, and that facilitate compression molding. For example, a thermoplastic-impregnated fiber filament can have a cross-sectional shape that is substantially round, oval, square, rectangular, triangular, or a complex shape. A thermoplastic-impregnated fiber filament can have features that facilitate layup, alignment with other filaments in the mold cavity, and/or compression molding. Such features can take the form, for example, of grooves or ridges.

Thermoplastic-impregnated fiber filament can have any suitable fiber reinforcement and can be impregnated with any suitable thermoplastic. The selection of the fiber and thermoplastic can depend on the desired physical properties of the compression molded part such as tensile strength, flexural modulus, flexural strength and tensile modulus, solvent resistance, thermal resistance, density, thermal carbon, polyester, a liquid crystal polymer such as Vectran®, aramid fiber such as Kevlar, cross-linked natural and synthetic rubbers, spandex fibers, segmented polyurethanes fibers such as Spandex®, cross-linked polyacrylate fiber such as anidex, and bi-constituent fiber of nylon and spandex.

Fibers can also include metal fibers.

A thermoplastic-impregnated fiber filament can have a single type of fiber or multiple different types of fiber where the different types of fiber can include different materials, thicknesses, or a combination thereof.

A thermoplastic-impregnated fiber filament can have cross-sectional dimension in which the height dimension is substantially similar to the height dimension. For example, the height can be from 0.25 to 6 times the width, from 0.5 to 4 times the width, or from 1 times to 3 times the width. For example, the width can be from 0.25 to 6 times the height, from 0.5 to 4 times the height, or from 1 times to 3 times the height. Thermoplastic-impregnated fiber filament are not in the form tapes or sheets of material. The filament has dimensions that facilitate heating a cross-section of the filament above the glass-transition temperature of the thermoplastic and then cooling the softened thermoplastic below the glass-transition temperature to set a shape to the filament. It is desirable that this heating and cooling process be carried out in less than 10 seconds, less than 5 seconds, less than 3 seconds, or less than 1 second. Suitable dimensions and time can be influenced by the glass transition of the thermoplastic and by the dimensions of a filament. In general, a filament can have a cross-sectional dimension, for example, less than 2 cm, less than 1.5 cm, less than 1 cm, less than 0.5 cm, or less than 0.25 cm.

Examples of suitable thermoplastics include polyethylene, polypropylene, polyvinyl chloride, polystyrene, acrylonitrile butadiene styrene, styrene butadiene styrene, styrene acrylonitrile, polyamide, polycarbonate, polymethylmethacrylate, polyoxymethylene (polyacetals), polyphenylene oxide, polyphenylene ether, polyethylene terephthalate, polybutylene terephthalate, polyetherimide, polyphenylene sulfide, ethylene tetrafluoroethylene, polyether ether ketone, liquid crystal polymer, polytetrafluoroethylene, perfluoroalkoxy copolymer, fluorinated ethylene propylene, polyimide, polyamide, polybenzimidazole, polysulfone, polyaryletherketone, and thermoplastic polyurethane.

A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

The amount of fiber in a thermoplastic-impregnated fiber filament can be within a range, for example, from 10 wt % to 90 wt %, from 20 wt % to 80 wt % from, 30 wt % to 70 wt %, from 40 wt % to 60 wt %, or from 60 wt % to 40 wt %, where wt % is based on the total weight of the filament. For example a thermoplastic-impregnated fiber filament can comprise from 40 wt % to 60 wt % fiber, where wt % is based on the total weight of the filament. The fiber in a thermoplastic-impregnated fiber filament can be within a range, for example, from 10 vol % to 90 vol %, from 20 vol % to 80 vol % from, 30 vol % to 70 vol %, from 40 vol % to 60 vol %, or from 60 vol % to 40 vol %, where vol % is based on the total volume of the filament. For example a thermoplastic-impregnated fiber filament can comprise from 40 vol % to 60 vol % fiber %, where vol % is based on the total volume of the filament. The amount of fiber and thermoplastic can be determined, for example, by the desired strength, density, part complexity, and/or cost.

A filament can comprise a single fiber or a plurality of isolated fibers disposed throughout the cross-sectional thickness of the filament. Individual fibers can be isolated, arranged in proximity to other fibers, or twisted with respect to adjacent fibers.

The one or more fiber bundles can be disposed within the cross-sectional dimension of the filament uniformly or non-uniformly. A fiber bundle can be situated at the center of the filament. A fiber bundle can comprise, for example, from 1,000 fiber to 80,000 fibers. Individual fibers forming a fiber bundle can have a diameter less than 5 µm, less than 20 µm, less than, less than 50 µm, or less than 100 µm. A fiber bundle can have a cross-sectional diameter, for example from 0.25 mm to 10 cm.

The fibers can be substantially parallel through the length of a filament, can be twisted, or can vary position throughout the length of a filament.

A fiber can comprise an inorganic fiber, an organic fiber, a ceramic fiber, a metal fiber, or a combination of any of the foregoing. Examples of suitable fiber include, glass, silica, carbon, boron, silica carbide, ceramic, metal, organic materials, and synthetic fibers. Examples of suitable synthetic fibers include nylon, polyester, polypropylene, meta-aramid, para-aramid, polyphenylene sulfide, and rayon.

A fiber can have a solid core or can have a hollow core and/or can comprise concentric layers of different materials A fiber and the configuration of a fiber can be selected such that a thermoplastic-impregnated fiber filament comprising the fiber can be shaped into a part and impart desirable properties to a finished part fabricated using the thermoplastic-impregnated fiber filament. For example, in small complex parts, with small-radius bends, smaller diameter and/or flexible fibers that are flexible can be used.

A fiber can be a composite. For example, a fiber can comprise a core that is coated with another material such as an electrically conductive material, an electrically insulating material, a thermally conductive material, a thermally insulating material, an impact resistant material, a lubricious material, or a smooth aesthetic material.

A fiber can have an exterior coating that enhances adhesion of the fiber to a thermoplastic.

A fiber can be selected to impart, for example, mechanical strength to a finished part, an electrical property to the finished part, a thermal property to the finished part, and/or a density to the finished part.

A filament can comprise any suitable thermoplastic. A thermoplastic can have any suitable melt temperature appropriate for compression molding. A thermoplastic can have a melt temperature above the anticipated use temperature of a part fabricated using the filament.

Thermoplastic-impregnated fiber filament can be prepared by co-extruding fiber and thermoplastic using well-known methods such as pultrusion.

Thermoplastic-impregnated fiber filament can have any suitable cross-sectional shape and dimension. The cross-sectional shape and dimension of a filament can be selected based on the configuration of the fabricated part, the dimensions of the fabricated part, and/or the layup of the filament within a mold cavity used to fabricate the part.

For example, a filament can have a round, oval, square, rectangular, triangular, or a complex cross-sectional shape.

A thermoplastic can be selected based on the thermal expansion coefficient or solvent resistance. The thermal expansion coefficient of a thermoplastic can be selected to tailor the expansion coefficient of the final composite material in combination with other composite constituents.

A fiber filament can be prepared by impregnating a plurality of continuous fiber with a composition such as a thermoplastic composition, a thermoset composition, or a ceramic composition. In addition to a matrix material, a composition can comprise a filler. Suitable filler can be selected to modify the mechanical, thermal, and/or electrical properties of the cured part. A filler can be selected to reduce the density of the cured thermoplastic part. A filler can comprise an inorganic filler, an organic filler, or a combination thereof. A suitable filler can include chopped fiber, particles, or a combination thereof. The filler such as a chopped fiber can include sections of chopped filament.

Examples of suitable fillers include inorganic fillers, such as carbon black and calcium carbonate ($CaCO_3$), silica, polymer powders, and lightweight fillers. A composition can comprise from 5 wt % to 60 wt % of the filler or combination of fillers, from 10 wt % to 50 wt %, or from 20 wt % to 40 wt %, based on the total weight of the composition. Suitable lightweight fillers can have a specific gravity less than 1, less than 0.8, less than 0.6, less than 0.4, less than 0.2, less than 0.1, or less than 0.05. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the matrix material.

Compositions can include low density filler particles. A low density particles can have a specific gravity of no more than 0.7, no more than 0.25, or no more than 0.1. Suitable lightweight filler particles can fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 microns to 300 microns and a specific gravity of 0.7 (Fillite®), aluminum silicate microspheres having a specific gravity of from 0.45 to 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of 40 μm and a density of 0.135 g/cc. Suitable fillers for decreasing the specific gravity of the composition include, for example, hollow microspheres such as Expancel® microspheres (available from AkzoNobel) or Dualite® low density polymer microspheres (available from Henkel).

A low density filler can comprise less than 20 wt % of a composition, less than 15 wt %, less than 10 wt %, less than 5 wt %, less than 3 wt %, less than 2 wt % or less than 1 wt % of a composition, where wt % is based on the total weight of the composition.

A filler can comprise an electrically and/or thermally conductive filler. Examples of suitable electrically and/or thermally conductive filler include nickel powders, nickel graphite, silver-coated glass spheres, carbon, graphite, metal fiber, and others.

A composition can comprise adhesion promoters. Adhesion promoters can enhance the adhesion of a thermoplastic to incorporated fiber. An adhesion promoter may be present in amount from 0.1 wt % to 15 wt % of a composition, less than 5 wt %, less than 2 wt %, or less than 1 wt %, based on the total dry weight of the composition. Examples of suitable adhesion promoters include phenolic resins, such as Methylon® phenolic resin, and organosilanes, such as epoxy, mercapto or amino functional silanes, such as Silquest® A-187 and Silquest® A-1100, available from Momentive Performance Materials. Other useful adhesion promoters are known.

A composition can comprise an additive. Examples of suitable additives include plasticizers, pigments, surfactants, adhesion promoters, thixotropic agents, fire retardants, masking agents, and combinations of any of the foregoing. When used, the additives may be present in a composition in an amount ranging, for example, from 0 wt % to 60 wt %, such as from 1 wt % to 60 wt % or from 5 wt % to 20 wt %. Additives may be present in a composition in an amount ranging from 25 wt % to 60 wt %, where wt % is based on the total weight of the composition.

Fiber filament can be applied as straight sections into a molding cavity. Straight sections can be applied in any suitable configuration such as aligned in the same direction, orthogonal to each other and/or on top of other filaments.

A fiber filament includes a straight section of filament and a shaped filament subunit. A straight filament subunit is a straight section of the fiber filament cut to a desired length for inserting into a mold cavity.

A fiber filament can be shaped into a shaped filament subunit. A shaped filament subunit represents a structural component that can be inserted into a mold cavity such as a compression mold cavity. Multiple filament subunits can be placed in a mold cavity in a predetermined configuration to assemble a molding layup. Filament subunits can be placed adjacent other filament subunits in the plane of the layup, over underlying filament subunits, and/or partly adjacent and partly overlying other filament subunits.

Fiber filament can be shaped into filament subunits for assembling the molding layup using any suitable method For example, to shape a filament into a shaped filament subunit, an end of a continuous filament can be drawn into a shaping apparatus, shaped into a predetermined two-dimensional and/or three dimensional configuration, and the shaped portion of the filament can be separated from the filament to provide a filament subunit.

Figure 6:
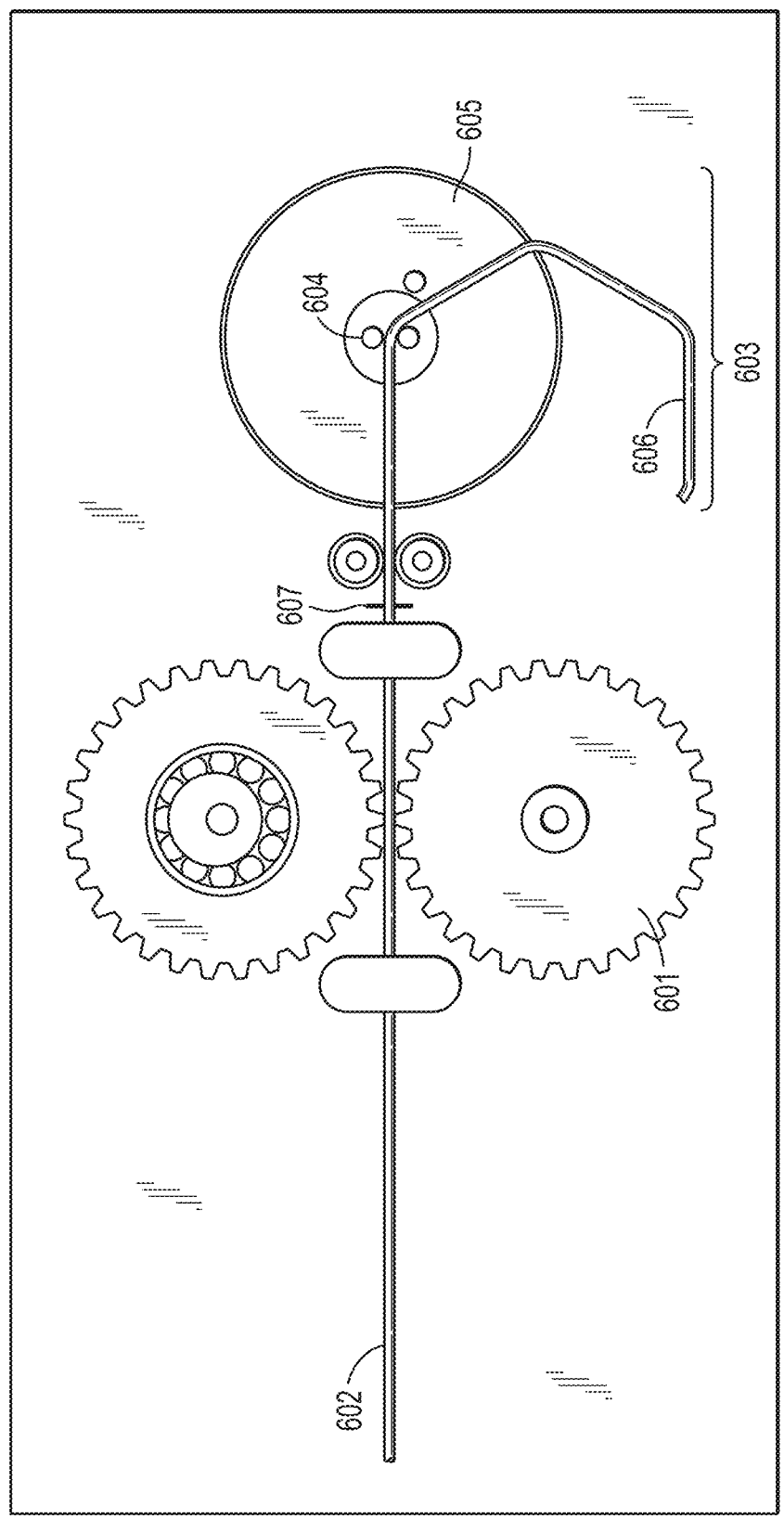
FIG. 6 shows an example of a filament subunit fabrication apparatus according to the present disclosure.

An example of an apparatus configured to shape a filament into a thermoplastic-impregnated fiber subunit is shown in FIG. 6.

FIG. 6 shows a schematic of a top view apparatus configured to advance filament 602; in this using case rotating rollers 601. Filament 602 is advanced into a shaping apparatus 603. In the shaping apparatus 603 a gripper (not shown) secures the filament and holds the filament under a slight tension. To shape the filament, a retractable heating element 604 is raised to heat the thermoplastic material of the filament above its glass transition temperature. The retractable heating element 604 is lowered into the shaping head 605. The gripper then moves the softened filament section against a cooling element (not shown) to form a bend in the filament. The cooling element is configured to cool the filament below the glass transition temperature of the thermoplastic to set the shape of the filament segment. The gripper releases the shaped filament section, additional filament is advanced into the shaping apparatus, the gripper secures the next section of filament and the shaping process is repeated one or more times as appropriate based on the desired configuration. When the filament subunit is shaped into a desired configuration, the shaped filament subunit is separated from the advancing filament to provide a shaped filament subunit. The shaped filament subunit can be assembled into a layup.

As shown in FIG. 6 the shaped filament can be formed into a series of 45° bends, A shaped filament subunit can have one or more bends. The configuration and the dimensions of a bend can be selected based on the shape and desired properties of the finished part. A bend can have any a suitable curvature or radius. The section of shaped filament on either side of a bend can be oriented at any suitable angle such as, for example, within a range from 5° to 175°, from 10° to 170°, from 15° to 165°, from 25° to 155°, or from 45° to 135°.

A filament can be shaped into a two-dimensional shaped filament subunit in which the subunit segments are within a single plane.

A filament can be shaped to form a three-dimensional shaped filament subunit. This can be accomplished by the gripper moving the heated filament orthogonal to the direction of the bend before the gripper brings the heated filament against the cooling block. The cooling block can include one or more features configured to control the three-dimensional shape.

The shape of shaped filament subunits can be selected to provide desired properties to a compression molded part. Mechanical modeling such as finite element analysis can be used to design a part to achieve certain properties such as tensile and/or flexural strength. The orientation and/or concentration of fiber can be determined to provide the desired properties of the completed part. The part can then be deconstructed into linear and shaped filament subunits that can be readily fabricated and assembled into a mold cavity to provide a layup. In this way, overly complex shapes can be avoided and fiber reinforcement can be concentrated in regions of the part to achieve optimum performance. For example, it can be desirable to have a higher concentration of reinforcing fiber and corners and at the perimeter of a part to improve rigidity. The shaped filament subunits can also be designed to minimize the number of piece parts and thereby facilitate assembly efficiency.

Heat may be imparted to a filament by conduction, convection and radiation including thermal convection through air, thermal conduction through direct contact with the filament, by radiation like infrared radiation, by laser and/or by inductive heating. A filament can include an alloy filament of fiber to facilitate the ability to inductively heat the matrix material such as a thermoplastic. The heating can be sufficient to raise the temperature of the matrix material sufficiently above the melt temperature that the filament can be mechanically deformed into a desired shape.

A heating block can comprise a heat source like resistive heating elements that employ heat transfer methods including conduction, convection and radiation and/or sources of electromagnetic radiation such as laser. A heating block can be open to the atmosphere or in a closed or semi-closed heated chamber.

A heating block can have any suitable dimensions for heating the thermoplastic of a filament above the glass transition temperature. The dimensions of the heating block can be selected based on the dimensions of the filament and the glass transition temperature of the thermoplastic. It can be desirable that the thermoplastic filament be heated above the glass transition temperature throughout the thickness of the filament, and that this be accomplished in a short time period to facilitate high-volume manufacturing. At the same time, it can be desirable that the temperature toward the surface of the filament not be sufficiently above the melt temperature of the thermoplastic such as to cause the material to sag or otherwise deform before cooling.

Figure 7:
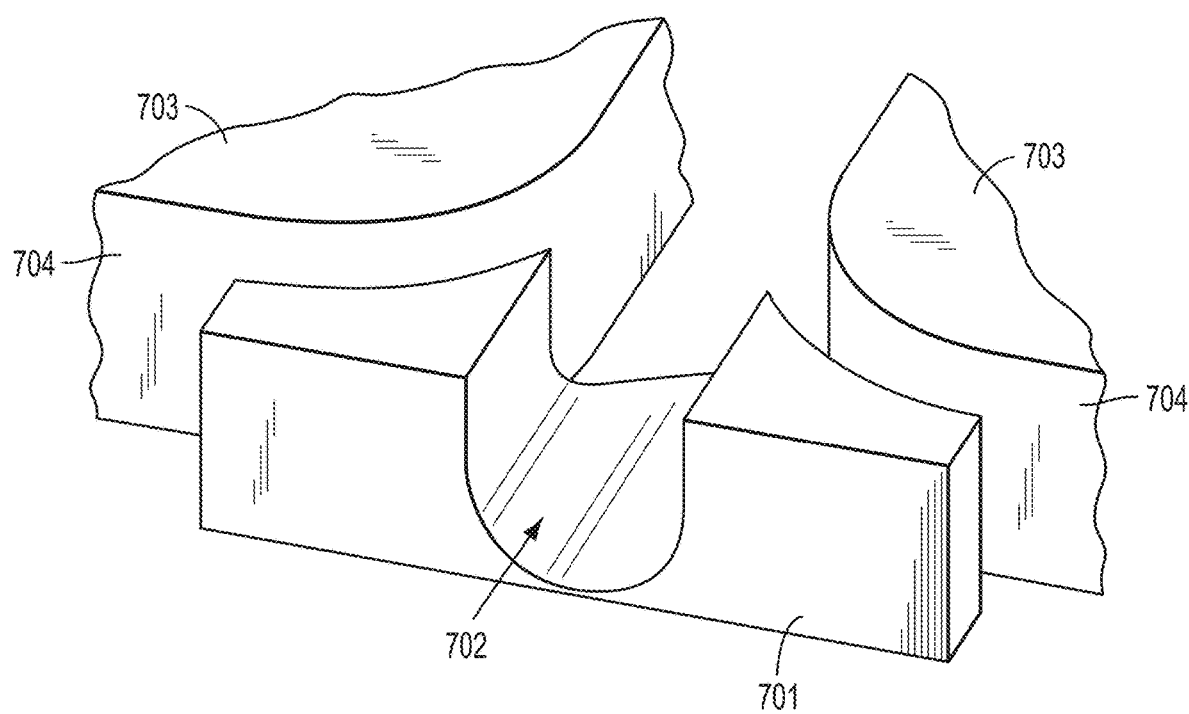
FIG. 7 shows an example of a filament shaping apparatus according to the present disclosure.

FIG. 7 shows an example of a configuration of heating and cooling elements used to shape a thermoplastic-impregnated fiber filament. In FIG. 7 the heating element 701 is shown as a U-shaped heating block, the heating block can be configured to surround the filament 702 such that the heating block includes a mating heating block.

In addition to having at least one retractable section to enable the heated filament to be moved toward the cooling block, the heating block can include at least one section configured to contact the filament to facilitate filament heating.

To facilitate high throughput production the advancing filament can be at least partially heated before entering the shaping apparatus. The filament can be partially heated above the melt temperature of the thermoplastic, for example, before the filament advancing apparatus, by the filament advancing apparatus, or anywhere before the filament enters the shaping apparatus.

The cooling element can comprise a heating block 703 configured to cool the filament below its glass transition temperature and to shape the filament section.

The temperature of the cooling block can be controlled by a fluid flowing through a one or more channels within the interior of the cooling block.

The cooling block can have an outer surface with a profile 704 for shaping a bend in the heated filament. The profile can have a desired curvature or radius.

A cooling block can comprise two or more cooling heads having different shapes and/or profiles. The two or more cooling blocks can be mounted, for example, on a carousel configured to move a selected cooling heads in position to provide a desired shape to the heated filament.

Whereas the heating and cooling cycle in typical thermoplastic part can significantly impact the properties of the finished part such as building stress into the part, in the present method, factors such as built in stress are of less if of any importance. Because the shaped filament subunits are used to build a layup that is then subjected to temperatures and pressures of compression molding that bring the temperature of the thermoplastic above the glass transition temperature, any stress resulting from the shaping process is annealed away during the subsequent compression molding operation.

The surfaces of the heating and cooling elements that can come into contact with the filament, and in particular the heated filament, can be treated to minimize or to prevent adhesion to the surfaces. For example, the material of the parts can be selected to minimize adhesion, or the surfaces can be impregnated or coated with a material to minimize adhesion such as treatment with a fluoropolymer.

After a filament section is shaped into a filament subunit, the filament subunit can be separated from the advancing filament using any suitable method such as, for example, by cutting. FIG. 6 shows a filament subunit 606 having four (4) bends and a cutting mechanism 607 for separating shaped filament subunit 606 from filament 602.

The separated shaped filament subunit can be further processed prior to layup assembly. For example, the ends of the fiber can be cut to a suitable length, the subunit can be placed in a heated mold to form the filament subunit into a three dimensional shape.

A fiber-reinforced filament can have a cross-sectional shape and dimension to substantially match the shape and dimension of the molding cavity it will be placed in. Furthermore, a fiber-reinforced filament can have features that facilitate alignment with adjacent and/or overlying layers of shaped filament. For example, a fiber-reinforced filament can have channels for tongue-and-groove alignment.

Finishing the filament subunit can comprise placing the filament subunit in a compression mold where the thermoplastic is brought about its melt temperature and further processed. After the filament subunit is shaped, a subsequent compression molding process can be used to tailor shape of the filament subunit, add features to facilitate alignment to the filament subunit in the mold cavity, and/or add features for strengthen the finished part. For example, the processing can be used to render the filament subunit planar, add grooves and tongues for alignment, and/or add through holes which can be used for alignment and/or for adding reinforcement such as a vertical wire at a bend or on either side of a bend. The processing can be performed to planarize the shaped filament subunit to facilitate layup assembly. In this operation, a shaped filament subunit can be compressed between heated platens.

In a production environment, the method of shaping filament can comprise multiple nodes in which the same or different shaping processes can operate simultaneously to harmonize filament shaping rate with compression molding rate.

The next step in forming a complex fiber-reinforced part is to place multiple filament subunits into a mold cavity.

A mold cavity is configured in substantially the shape of the finished part. The mold cavity is used to compression mold the part and the layup refers to the stack of materials such as the stack of linear and/or shaped filament subunits inserted into the mold cavity prior to compression molding. Frequently, compression molding is performed using thermoset materials that can be exothermic. In the disclosed methods, because a thermoplastic material is employed, the compression mold is heated such that the thermoplastic can be heated above the melt temperature to enable the thermoplastic in the filament to flow and conform to the mold cavity to provide the shape of the finished part.

The mold cavity can be made of any suitable material such as P-20 mold steel.

To assembly the layup a plurality of filament subunits are selected and placed into the mold cavity into a predetermined configuration. A plurality of filament subunits are provided, which when placed in the mold cavity to form the filament layup, are subsequently heated and compressed using compression molding, cooled, and then ejected from the mold to provide a part.

The filament subunits can be assembled on top of other filament subunits, adjacent other filament subunits, and/or within the same plane as another filament subunit. For any given cross-section of a mold there will be two or more filament subunits stacked on top of each other. This configuration can impart increased strength to the finished part and facilitates the use of fiber-reinforced filaments with smaller cross-sectional dimensions as appropriate for forming complex parts.

Figure 8C:
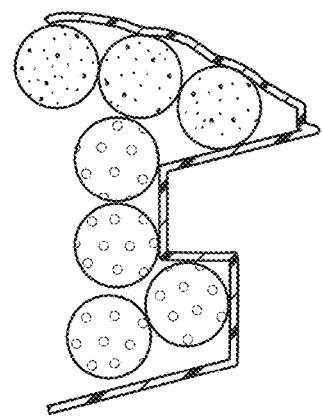
FIGS. 8A-8F show examples of layups with multiple filament subunits.
Figure 8F:
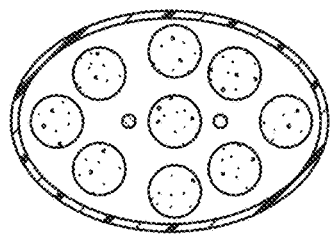
Figure 8B:
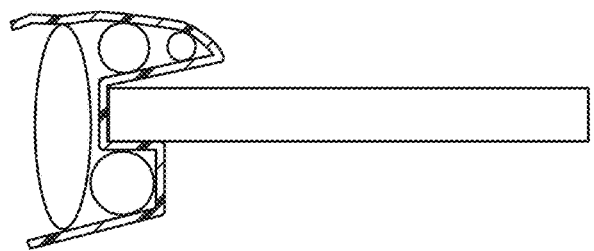
Figure 8E:
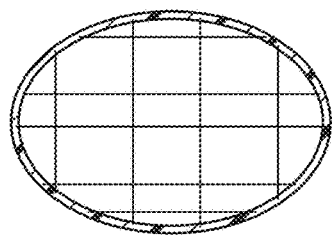
Figure 8A:
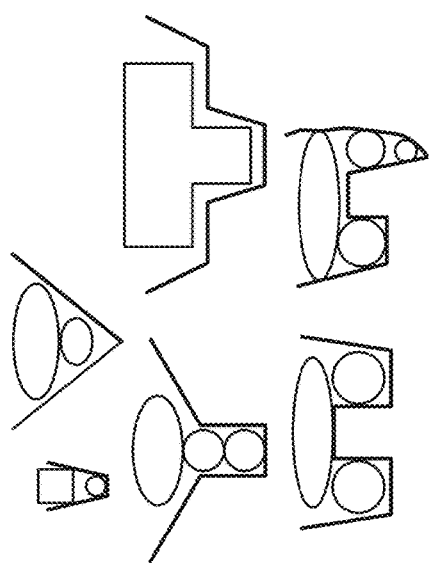
Figure 8D:
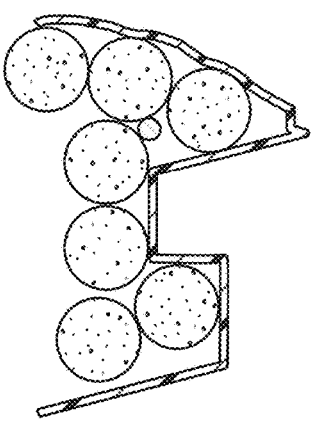

Individual filament subunits can be placed into a mold cavity using pick-and-place equipment. The filament subunits can have various cross-sectional dimensions and/or shapes depending, for example, on the dimensions of the cavity and/or the position of a filament subunit within the layup. Examples of various layup configurations are shown in FIGS. 8A-8F. FIG. 8A shows cross-sections of various filament subunits having various profiles fit into various cavities. The individual filament subunits can have dimensions that approximately fill the various dimensions of the cavity and can comprise various materials as suitable to meet the performance requirements of the completed part. FIG. 8B shows another cross-sectional view of a filament subunit layup. FIG. 8C shows a view of a filament layup in which the filaments subunits on the left have one property and the filament subunits on the right have a different property. For example, the filament subunits on the right can be selected to increase the thermal conduction of the inner portion of the completed part and the filament subunits on the right can be selected to increase thermal insulation. The filament subunits on the right can have a certain color or include an additive such as wood fiber to enhance the aesthetics of the outward-facing surface. FIG. 8D shows an arrangement similar to that of FIG. 8C, but with the addition of an embedded element identified by the small-diameter feature. This element can be, for example, a wire, a channel, a sensor, an optical fiber, or other element. For example, as a resistive wire, heat could be provided to the part. Alternatively, as a cooling channel, a liquid or gas can be passed through the channel to cool the part. FIG. 8E shows a view, such as a top view of a bicycle helmet, in which filament subunits are laid into the compression mold at strategic locations to improve the overall strength of the bicycle helmet. The continuous fiber can provide a secondary reinforcement when the mesh-composite shell fractures and thereby reduce the impact injury due to fragments. The filament subunits are design to the shape of the mold. FIG. 8F shows a profile of an oval-shaped part with co-aligned continuous fiber regions indicated by the stippled circles and embedded wire represented by the solid circles. Such high strength structural members can be used, for example, in bicycle frames, drones, UAV arms, robotics, buildings, lighting, motorized vehicle frames, prosthetics, or medical devices. The wires can be used as antennas, controls, interconnects, sensors, or strain gauges.

The methods of manufacturing unidirectional fiber composite parts provided by the present disclosure combines the advantages of methods used for automated fiber placements, automated tape layup and additive manufacturing, and compression molding. Automated fiber layup is capable of depositing fibers at high speed to produce convex parts with limited intentional alignment and shaping of continuous fibers. The present method avoid disadvantages of automated fiber placement associated with the limited ability to fabricate complex parts and adhesion between interlayers. Automated tape layup and additive manufacturing can be used to intentional align and shape continuous fibers but the process is slow, expensive and can be restricted to certain geometries. Compression molding provide high part integrity and interlayer adhesion, can be automated for high speed and high volume production, and can provide excellent surface finishes, maintain tight tolerance, is repeatable, and can be adapted to many material systems. On the other hand, typical compression molding processes are not amenable to the intentional alignment and shaping of fibers.

The shape, dimensions, and materials forming the layup can be selected to provide a finished part having a desired property.

The design of the layup can be established based on mechanical modeling of the fabricated part. For example, finite element analysis can be used to model the mechanical properties of a fabricated part based on the configuration of the filament subunits, fiber, thermoplastic, and other materials used in the layup.

One of the objectives of using co-aligned continuous fiber filament is to improve the flexural strength of a complex part compared to similarly shaped parts fabricated using other thermoplastic-based methods, thermoset-based methods, or ceramic-based methods.

One of the objectives of using a co-aligned continuous fiber filament is to reduce the weight and/or size a complex part compared to similarly shaped parts fabricated using other manufacturing methods such as by machining metal parts The layup can also include shaped subunits that do not contain fiber.

The layup can also include chopped filament. The chopped filament can comprise the same material as the continuous fiber-reinforced filament and/or a different fiber and/or matrix material than that of the continuous fiber-reinforced filament.

The filament sections in a layup can be selected to provide selected properties in different regions of a part.

For example, for parts in which it is desired that certain regions are thermally conductive and others thermally non-conductive, the select filament subunits can be selected accordingly. An example is shown in FIG. 8C in which the filament subunits on the left are thermally insulating and can include glass fiber, and the filament subunits on the right are thermally conductive and can include graphite.

Thus, for a cross-sectional profile of a part the filament subunits can be selected such that one or more properties are different across or in certain regions of the profile. Furthermore, the filament subunits can be selected such that the part has different properties in different sections of the part.

A layup can also include other elements such as wire, optical fiber, channel, and tubing. These elements can be used for heating, cooling, pneumatics, hydraulics, sensing, interconnection, signal transmission. The connectorized elements can be fixture into the mold for precise alignment and streamlined production when assembling the layup.

The layup can be assembled in a holding tray. The filament subunits can be held together by melting the thermoplastic resin and tack bonding overlying and/or adjacent filament segments. The layups in the holding tray can be transferred to a mold cavity.

After transferring the layup to the compression molding cavity, molten thermoplastic resin can be added to the cavity to reduce or to eliminate voids.

A mold cavity can include appropriately located sprues to facilitate even compression.

In a production environment, a compression mold can comprise multiple cavities in which the filament layups can be molded into a completed part.

The materials used in the layup can be selected for compatibility. For example, thermoplastics used in the layup can be selected to have a similar melt temperature and/or similar thermoplastic families can be selected to improve intermolecular diffusion.

When dissimilar materials can be used there the interfaces can be incompatible such as having poor interfacial bonding strength that can cause a part to delaminate.

To avoid or minimize interface incompatibility and pull-out materials and filaments used in a layup can have surface treatments to facilitate interfacial bonding. These can include primers or interlayer coatings that are well known in the coating industry. The thermoplastics can comprise adhesion promoters that facilitate bonding to the fiber and/or to other materials within the layup.

In addition to the fiber filament, a layup can include filament (without fiber) and/or pellets comprising the matrix material. The filament can comprise segments of thermoplastic formed into subunits. Pellets, beads, or other shapes can comprise the same or similar t composition as in the fiber filament. Pellets can comprise a filler such as an organic filler, an inorganic filler, or a combination therefore, which can be thermally conductive, electrically conductive, or lightweight. A pellet composition can comprise adhesion promoters and additives as appropriate.

A layup can also include fiber filament extruded into the mold cavity. Fiber filament can be extruded using an additive manufacturing apparatus fitted with a heated nozzle and the molten thermoplastic fiber filament deposited into the mold cavity in a desired configuration.

Additional fiber-reinforced segments can be inserted into the layup such that the fiber orientation is orthogonal to the long fiber segments in the set up. The orthogonal fibers can be situated in regions of the part where increased structural integrity and resistance to delamination is desired. Certain part loading scenarios might require fiber orientation between that of the aforementioned long fiber segments and orthogonal reinforcements or alternatively, a combination of orientations at different sections of the part might be required for complex loading scenarios.

It can be desirable to select the dimensions and cross-sectional profile of overlying filament subunits to prevent or minimize the potential for an overlying filament to slip past into or past an underlying filament subunit or section of a filament subunit during compression molding.

A layup can comprise vertical reinforcing elements such as vertical metal segments A layup can comprise embedded wire, optical fiber, sensors, channels, or a combination of any of the foregoing. These and other elements can be used, for example, for interconnection, thermal control, sensing, and/or communications.

Compression molding is widely used with thermoset materials. In compression molding the charge or as applicable here, the layup, is heated and compressed under high pressure to form a part.

For purposes of the present invention the mold cavity can be heated above the melt temperature of the thermoplastics used in the layup and pressure applied to cause the thermoplastic and impregnated fiber to flow and fill the cavity. The mold is then cooled to below the melt temperature and the part removed from the cavity.

The cycle time of each of the processes, heating, application of pressure, and cooling can be selected to optimize manufacturing throughput and to optimize the properties of the finished part. For example, the temperature and pressure and time can be selected to ensure adequate flow of the material and redistribution of the fibers, and the cooling temperature and time can be selected, for example, to minimize stress in the finished part.

An objective of the invention is to fabricate complex parts having a higher tensile strength. The method can be used, for example, to fabricate high strength thermoplastic parts that can be used to replace metal parts.

A fiber-reinforced part provided by the present disclosure has long segments of fiber oriented parallel to or roughly following a surface having the largest dimension of the part.

A fiber-reinforced composite part can comprise a plurality of co-aligned fiber segments embedded within a thermoplastic resin.

In cross-section, the part can have multiple fiber segments stacked on top of each other. In the orthogonal cross-section, the part will show long segments of fiber bundles.

For example, a fiber-reinforced composite part can comprise a first dimension and a second dimension; wherein the second dimension is orthogonal to the first dimension; wherein a first cross-section of the composite part parallel to the first dimension comprises one or more substantially parallel fibers; and wherein a second cross-section of the composite part parallel to the second dimension comprises end sections of one or more fibers. In certain parts a section containing fibers can have a plurality of fibers distributed substantially homogeneously throughout the cross-section of the part.

A fiber-reinforced part can have a specific gravity, for example, from 1.0 to 1.5, from 1.1 to 1.5, from 1.2 to 1.5, or from 1.2 to 1.4.

A fiber-reinforced part can have a tensile strength from 100 MPa to 600 MPa, from 100 MPa to 400 MPa, from 150 MPa to 350 MPa, or from 200 MPa to 300 MPa.

A fiber-reinforced part can have a tensile modulus, for example, from 10,000 MPa to 70,000 MPa, from 15,000 MPa to 60,000 MPa, from 20,000 MPa to 55,000 MPa, from 25,000 MPa to 50 MPa, or from 30 MPa to 45,000 MPa.

Methods and apparatus provided by the present disclosure can be used to fabricate complex parts having high mechanical strength.

Figure 9:
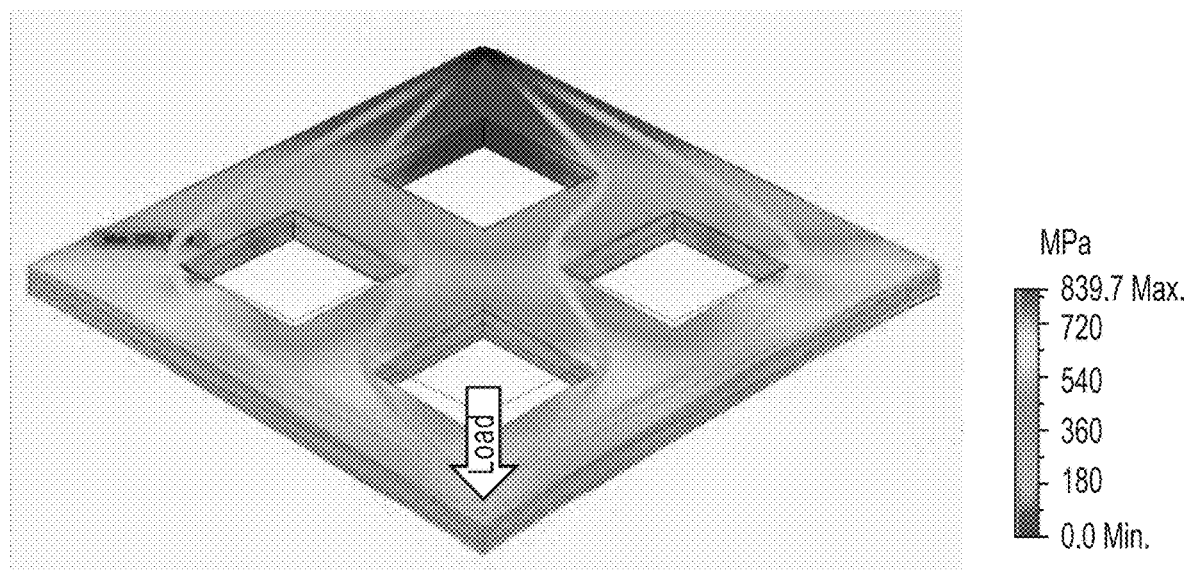
FIG. 9 shows the stress profile of a part fabricated using methods according to the present disclosure.

FIG. 9 shows a stress profile of a part fabricated using methods according to the present disclosure. FIG. 9 shows the stress profiled of a part calculated using finite element analysis. The arrangement of co-aligned continuous fiber in the part is shown by the grey lines. The fibers are aligned along loading paths within the part and thereby increase the strength and stiffness of the part. The strength of the part is greater than that of a comparable metal part and lower in weight than a metal part. This is accomplished while using the design flexibility and high throughput of compression molding.

Parts fabricated using methods and apparatus provided by the present disclosure can be used, for example, for replacing metal parts, in aerospace applications, consumer electronics, sporting equipment, vehicles, surgical implants, communications devices, portable devices, medical devices, robotics, industrial equipment and prosthetics.

The methods and apparatus are particularly useful for fabricating small, complex parts and geometries with open lattice-like structures.

A filament can be shaped using a number of methods, which in part can be determined by the configuration of the shaped filament subunit.

A method of fabricating a shaped filament subunit can comprise securing a section of one or more filaments; and shaping the one or more filament sections to provide one or more shaped filament subunits.

Tension can be applied to the filament during shaping.

Before a filament is shaped, heat can be applied to at least a portion of the filament section. The heat can soften the filament section such that it can be formed into a desired shape. After the heated filament section is shaped, the heated filament section can be cooled. Cooling can involve allowing the heat to dissipate, applying a cooling block directly to the heated and shaped section, or forcing cold air over the heated and shaped section. Cooling can proceed on an appropriate time scale and can include progressively cooling the heated and shaped filament section.

Shaping can include combining two or more filaments into a single filament than can then be shaped. The each of the one or more filaments to be combined can independently comprise an aligned fiber filaments, a non-aligned fiber filaments, or a non-fiber filament.

A method of fabricating a shaped filament subunit can involve simultaneously shaping multiple filaments to provide multiple respective filament subunits. The same operation(s) that are sued to fabricated a single filament subunit can be used to fabricate multiple filament subunits.

Other methods of shaping a filament subunit include depositing a filament into cavity having the shape of a desired filament subunit. Shaping can comprise applying a filament onto a surface in the shape of a desired filament subunit.

During the process of shaping, a part can be embedded into the bulk of the shaped filament, embedded in a surface of a shaped filament, or applied to the surface of a shaped filament. The parts can add strength to a part fabricated using the shaped filament, add a function such as connectors to a part fabricated using the shaped filament. Suitable parts include, for example, part comprises a pin, an insert, a standoff, an anchor, a shaft, a tube, a connector, a fabric, a unidirectional prepreg, a bidirectional prepreg, or a combination of any of the foregoing. The part can be introduced into the bulk and/or surface of the shaped filament during shaping when the filament matrix material is pliable. For example, during shaping, a filament is can be bent around a part, which then can become incorporated into the shaped filament.

An alternative way of fabricating a part from filament comprises securing one or more filaments to a first anchor; and extending the one or more filaments in a direction away from the first anchor to provide the part. As the one or more filaments is drawn away from the anchor the one or more filaments can be laid down in a desired shape. As the one or more filaments is drawn away from the first anchor the extending filaments can be secured to one or more second anchors and the one or more filaments can be extended by drawing the one or more filaments away from the one or more second anchors.

Intersections between the one or more filaments can be joined such as be applying heat and pressure to the intersections, and/or by depositing a reinforcing composition at the intersections, wherein the reinforcing composition can comprise chopped fiber, milled fiber, or a combination thereof.

Aspects of the Invention

Aspect 1. A fiber-reinforced composite part, comprising one or more sections, wherein, at least one of the one or more sections comprises two or more aligned fiber portions; and each of the two or more aligned fiber portions independently comprises a plurality of co-aligned continuous fibers within a composition.

Aspect 2. The fiber-reinforced composite part of aspect 1, wherein each of the compositions independently comprises a matrix material, wherein the matrix material comprises a thermoplastic, thermoset, or a ceramic.

Aspect 3. The fiber-reinforced composite part of any one of aspects 1 to 2, wherein the two or more aligned fiber portions comprise: a first aligned fiber portion, wherein the plurality of co-aligned continuous fibers comprises a first configuration; and a second aligned fiber portion, wherein the plurality of co-aligned continuous fibers comprises a second configuration; wherein the first configuration is substantially the same as the second configuration.

Aspect 4. The fiber-reinforced composite part of any one of aspects 1 to 3, wherein the two or more aligned fiber portions comprise: a first aligned fiber portion, wherein the plurality of co-aligned continuous fibers comprises a first configuration; and a second aligned fiber portion, wherein the plurality of co-aligned continuous fibers comprises a second configuration; wherein the first configuration is substantially different than the second configuration.

Aspect 5. The fiber-reinforced composite part of any one of aspects 1 to 4, wherein the two or more aligned fiber portions comprise: a first aligned fiber portion comprising a first composition; and a second aligned fiber portion comprising a second composition, wherein the first composition is substantially the same as the second composition.

Aspect 6. The fiber-reinforced composite part of any one of aspects 1 to 5, wherein the two or more aligned fiber portions comprise: a first aligned fiber portion comprising a first composition; and a second aligned fiber portion comprising a second composition, wherein the first composition is different than the second composition.

Aspect 7. The fiber-reinforced composite part of any one of aspects 1 to 6, wherein the one or more sections comprise: a first section comprising a first aligned fiber portion, wherein the first aligned fiber portion comprises a plurality of co-aligned continuous fibers having a first configuration; and a second section comprising a second aligned fiber portion, wherein the second aligned fiber portion comprises a plurality of co-aligned continuous fibers having a second configuration; wherein the first configuration is substantially the same as the second configuration.

Aspect 8. The fiber-reinforced composite part of any one of aspects 1 to 7, wherein the one or more sections comprise: a first section comprising a first aligned fiber portion, wherein the first aligned fiber portion comprises a plurality of co-aligned continuous fibers having a first configuration; and a second section comprising a second aligned fiber portion, wherein the second aligned fiber portion comprises a plurality of co-aligned continuous fibers having a second configuration; wherein the first configuration is different than the second configuration.

Aspect 9. The fiber-reinforced composite part of any one of aspects 1 to 8, wherein at least one of the two or more aligned fiber portions comprises a plurality of co-aligned continuous fibers disposed substantially uniformly throughout the aligned fiber portion.

Aspect 10. The fiber-reinforced composite part of any one of aspects 1 to 9, wherein at least one of the two or more aligned fiber portions comprises from 10 wt % to 70 wt % fibers, wherein wt % is based on the total weight of the at least one aligned fiber portion.

Aspect 11. The fiber-reinforced composite part of any one of aspects 1 to 10, wherein at least one of the two or more aligned fiber portions comprises from 10 vol % to 70 vol % fibers, wherein vol % is based on the total volume of the at least one aligned fiber portion.

Aspect 12. The fiber-reinforced composite part of any one of aspects 1 to 11, wherein, each of the compositions independently comprises a matrix material; and the matrix material of each of the two or more aligned fiber portions is continuous with the matrix material of each of the other two or more aligned fiber portions.

Aspect 13. The fiber-reinforced composite part of any one of aspects 1 to 12, wherein, each of the at least one of the one or more sections further comprises one or more non-fiber portions; and each of the one or more non-fiber portions comprises a composition without co-aligned continuous fibers and without non-aligned fibers.

Aspect 14. The fiber-reinforced composite part of any one of aspects 1 to 13, wherein, each of the at least one of the one or more sections comprises one or more non-aligned fiber portions; and each of the one or more non-aligned fiber portions comprises a composition comprising a plurality of non-aligned fibers.

Aspect 15. The fiber-reinforced composite part of aspect 14, wherein the plurality of non-aligned fibers comprises a length less than 10 cm.

Aspect 16. The fiber-reinforced composite part of any one of aspects 14 to 15, wherein the plurality of non-aligned fibers are oriented substantially orthogonal to an alignment of the co-aligned continuous fibers in an aligned fiber portion.

Aspect 17. The fiber-reinforced composite part of any one of aspects 14 to 16, wherein the plurality of non-aligned fibers comprises chopped fibers, milled fibers, or a combination thereof.

Aspect 18. The fiber-reinforced composite part of any one of aspects 14 to 17, wherein the plurality of non-aligned fibers are in the form of pellets.

Aspect 19. The fiber-reinforced composite part of any one of aspects 1 to 18, wherein at least one aligned fiber portion further comprises a plurality of non-aligned fibers.

Aspect 20. The fiber-reinforced composite part of aspect 19, wherein the plurality of non-aligned fibers comprises a length less than 10 cm.

Aspect 21. The fiber-reinforced composite part of any one of aspects 19 to 20, wherein the plurality of non-aligned fibers are oriented substantially orthogonal to an alignment of the co-aligned continuous fibers in an aligned fiber portion.

Aspect 22. The fiber-reinforced composite part of any one of aspects 19 to 21, wherein the plurality of non-aligned fibers comprise chopped fibers, milled fibers, or a combination thereof.

Aspect 23. The fiber-reinforced composite part of any one of aspects 19 to 22, wherein the plurality of non-aligned fibers are in the form of pellets.

Aspect 24. The fiber-reinforced composite part of any one of aspects 19 to 23, wherein the plurality of non-aligned fibers are entangled among the plurality of co-aligned continuous fibers.

Aspect 25. The fiber-reinforced composite part of any one of aspects 1 to 24, wherein the one or more sections comprising two or more aligned fiber portions further comprises: one or more non-aligned fiber portions comprising non-aligned fiber; one or more non-fiber portions without co-aligned continuous fiber and without non-aligned fiber; or both one or more non-aligned fiber portions and one or more non-fiber portions.

Aspect 26. The fiber-reinforced composite part of aspect 25, wherein, each of the two or more aligned fiber portions independently comprises a first matrix material; each of the one or more non-aligned fiber portions comprises a second matrix material; and each of the one or more non-fiber portions comprises a third matrix material.

Aspect 27. The fiber-reinforced composite part of aspect 26, wherein, the first matrix material and the second matrix material comprise the same matrix material; the first matrix material and the third matrix material comprise the same matrix material; the second matrix material and the third matrix material comprise the same matrix material; or each of the first matrix material, the second matrix material, and the third matrix material comprise the same matrix material.

Aspect 28. The fiber-reinforced composite part of aspect 26, wherein each of the first matrix material, the second matrix material, and the third matrix material is continuous with each of the other matrix materials.

Aspect 29. The fiber-reinforced composite part of aspect 25, wherein, the first matrix material and the second matrix material comprise a different matrix material; the first matrix material and the third matrix material comprise a different matrix material; the second matrix material and the third matrix material comprise a different matrix material; or the first matrix material, the second matrix material, and the third matrix material comprise a different matrix material.

Aspect 30. The fiber-reinforced composite part of aspect 25, wherein each of the first matrix material, the second matrix material, and the third matrix material is continuous with each of the other matrix materials.

Aspect 31. The fiber-reinforced composite part of any one of aspects 1 to 31, wherein, each of the two or more aligned fiber portions independently comprise a first composition; each of the one or more non-aligned fiber portions comprises a second composition; and each of the one or more non-fiber portions comprises a third composition, wherein each composition comprises a matrix material and one or more additives.

Aspect 32. The fiber-reinforced composite part of aspect 31, wherein, the first composition and the second composition comprise the same composition; the first composition and the third composition comprise the same composition; the second composition and the third composition comprise the same composition; or each of the first composition the second composition, and the third composition comprise the same composition.

Aspect 33. The fiber-reinforced composite part of aspect 31, wherein, the first composition and the second composition comprise a different composition; the first composition and the third composition comprise a different composition; the second composition and the third composition comprise a different composition; or each of the first composition, the second composition, and the third composition comprise a different composition.

Aspect 34. The fiber-reinforced composite part of aspect 31, wherein each of the first composition, the second composition, and the third composition is continuous with each of the other compositions.

Aspect 35. The fiber-reinforced composite part of any one of aspects 1 to 35, wherein at least one of the one or more sections does not comprise a co-aligned continuous fibers and does not comprise non-aligned fibers.

Aspect 36. The fiber-reinforced composite part of any one of aspects 1 to 36, wherein at least one of the one or more sections comprises non-aligned fibers.

Aspect 37. The fiber-reinforced composite part of any one of aspects 1 to 37, wherein at least one of the one or more sections does not comprise co-aligned continuous fibers.

Aspect 38. The fiber-reinforced composite part of any one of aspects 1 to 38, wherein the plurality of co-aligned continuous fibers comprises from 5 fibers to 80,000 fibers.

Aspect 39. The fiber-reinforced composite part of any one of aspects 1 to 39, wherein the plurality of co-aligned continuous fibers comprises silica, glass, carbon nanotubes, carbon, polymer, metal, ceramic, natural fiber, synthetic fibers, or a combination of any of the foregoing.

Aspect 40. The fiber-reinforced composite part of any one of aspects 1 to 40, wherein the plurality of co-aligned continuous fibers is in the form of a wire, a fabric, a ribbon, an extruded shape, a solid shape, a hollow shape, a perforated shape, a tube, a crystalline form, a non-crystalline form, an organic shape, a roving, a sliver, a tow, a bundle, a spiral, or a combination of any of the foregoing.

Aspect 41. The fiber-reinforced composite part of any one of aspects 1 to 41, wherein at least one of the one or more sections comprises at least one linear portion, at least one bend, or a combination thereof.

Aspect 42. The fiber-reinforced composite part of aspect 41, wherein the at least one bend forms an angle within a range from 5° to 179°.

Aspect 43. The fiber-reinforced composite part of any one of aspects 1 to 42, wherein at least one of the one or more sections comprises an embedded wire, an embedded electrical conductor, an embedded thermal conductor, an embedded waveguide, an embedded optical fiber, an embedded sensor, an embedded channel, an embedded tube, or a combination of any of the foregoing.

Aspect 44. A method of fabricating a fiber-reinforced composite part comprising; providing one or more filament subunits, wherein, each of the one or more filament subunits independently comprises a linear filament subunit, a shaped filament subunit, or a combination thereof; and at least one of the one or more filament subunits comprises a first composition and a plurality of co-aligned continuous fibers; placing the one or more filament subunits into a mold cavity to form a layup; and compression molding the layup to provide a fiber-reinforced composite part.

Aspect 45. The method of aspect 44, wherein the one or more filament subunits further comprise: a filament subunit comprising a second composition and a plurality of non-aligned fibers; a filament subunit comprises a third composition and does not comprise a co-aligned continuous fibers and does not comprise non-aligned fibers; or a combination thereof.

Aspect 46. The method of aspect 45, wherein, each of the first composition, the second composition; and the third composition comprises substantially the same composition.

Aspect 47. The method of aspect 45, wherein, each of the first composition and the second composition comprise the same matrix material; the first composition and the third composition comprise the same matrix material; the second composition and the third composition comprise the same matrix material; or the first composition, the second composition, and the third composition comprise the same matrix material.

Aspect 48. The method of aspect 45, wherein, each of the first composition and the second composition comprise a different matrix material; the first composition and the third composition comprise a different matrix material; the second composition and the third composition comprise a different matrix material; or the first composition, the second composition, and the third composition comprise a different matrix material.

Aspect 49. The method of any one of aspects 44 to 48, wherein placing the one or more filament subunits into a mold cavity comprises placing the one or more filament subunits into a holding tray to form an assembly layup, and transferring the assembly layup to the mold cavity.

Aspect 50. The method of any one of aspects 44 to 49, wherein placing the one or more filament subunits into a mold cavity comprises placing the one or more filament subunits onto an underlying filament subunit, adjacent a filament subunit, or a combination thereof.

Aspect 51. The method of any one of aspects 44 to 50, wherein the plurality of co-aligned continuous fibers are dispersed substantially uniformly throughout the filament subunit.

Aspect 52. The method of any one of aspects 44 to 51, wherein the shaped filament subunit comprises one or more bends.

Aspect 53 The method of aspect 52, wherein each of the one or more bends independently forms an angle within a range from 5° to 179°.

Aspect 54. The method of any one of aspects 44 to 53, wherein the at least one filament subunit comprises from 1 wt % to 80 wt % of a plurality of co-aligned continuous fibers, wherein wt % is based on the total weight of the filament subunit.

Aspect 55. The method of any one of aspects 44 to 54, wherein the at least one filament subunit comprises from 1 vol % to 80 vol % of a plurality of co-aligned continuous fibers, wherein vol % is based on the total volume of the filament subunit.

Aspect 56. A fiber-reinforced composite part fabricated according to the method of any one of aspects 44 to 55.

Aspect 57. A method of fabricating one or more shaped filament subunits, comprising:
securing a section of each of one or more filaments; and
shaping the one or more filament sections to provide one or more shaped filament subunits.

Aspect 58. The method of aspect 57, wherein shaping comprises applying tension to the one or more filament sections.

Aspect 59. The method of any one of aspects 57 to 58, further comprising, before shaping, heating at least a portion of the one or more filament sections.

Aspect 60. The method of aspect 59, further comprising, after shaping the one or more filament sections, cooling the heated portion of the one or more shaped filament sections.

Aspect 61. The method of any one of aspects 57 to 60, wherein, shaping comprises using dies, rollers, or a combination thereof to shape the heated portion of the one or more filament sections; and cooling comprises progressively cooling.

Aspect 62. The method of any one of aspects 57 to 61, wherein heating a portion of the one or more filament sections comprises heating the portion of the one or more filament sections simultaneously while advancing the one or more filaments.

Aspect 63. The method of any one of aspects 57 to 62, wherein shaping comprises bending the one or more filament sections.

Aspect 64. The method of any one of aspects 57 to 63, further comprising, after shaping the one or more filament sections, separating the one or more shaped filament sections from the one or more respective filaments.

Aspect 65. The method of any one of aspects 57 to 64, wherein each of the one or more filaments independently comprises: a first composition and a plurality of co-aligned continuous fiber; a second composition and a plurality of non-aligned fiber; or a third composition without continuous fibers and without non-aligned fibers, wherein each of the first composition, the second composition, and the third composition is independently the same or different than each of the other compositions.

Aspect 66. The method of any one of aspects 57 to 65, wherein shaping comprises applying the one or more filament sections to a surface.

Aspect 67. The method of any one of aspects 57 to 66, wherein shaping comprises depositing the one or more filament sections into a cavity.

Aspect 68. The method of any one of aspects 57 to 67, further comprising, after shaping, partially curing the one or more shaped filament sections.

Aspect 69. The method of any one of aspects 57 to 68, further comprising, before securing, combining two or more filaments into a combined filament.

Aspect 70. The method of any one of aspects 57 to 69, wherein shaping comprises embedding a part in the one or more filament sections.

Aspect 71. The method of aspect 70, wherein the part comprises a pin, an insert, a standoff, an anchor, a shaft, a tube, a connector, a fabric, a unidirectional prepreg, a bidirectional prepreg, or a combination of any of the foregoing.

Aspect 72. A shaped filament subunit fabricated according to the method of any one of aspects 57 to 72.

Aspect 73. A filament subunit fabrication apparatus, comprising: a filament feeder configured to advance filament; securing device configured to secure and to manipulate a section of the advancing filament; a heating element configured to heat a portion of the secured filament section; and a shaping element configured to shape and to cool the heated portion of the filament section.

Aspect 74. The apparatus of aspect 73, wherein, the shaping element comprises dies, rollers, or a combination thereof configured to shape the heated filament section; and the shaping element is configured to progressively cool the heated portion of the filament section.

Aspect 75. The apparatus of any one of aspects 73 to 74, wherein the securing device is configured to hold the advancing filament section in tension and to move the heated filament section against the cooling element.

Aspect 76. The apparatus of any one of aspects 73 to 75, wherein configured to shape the heated portion comprises configured to bend the heated portion.

Aspect 77. The apparatus of any one of aspects 73 to 75, wherein, the filament comprises a co-aligned continuous fiber filament.

Aspect 78. A method of fabricating a part, comprising: securing one or more filaments to a first anchor; and extending the one or more filaments in a direction away from the first anchor to provide the part.

Aspect 79. The method of aspect 78, further comprising, during the extension of the one or more filaments, securing the one or more filaments to one or more second anchors; and further extending the one or more filaments in a direction away from the one or more second anchors.

Aspect 80. The method of any one of aspects 78 to 79, wherein extending comprises joining filament intersections.

Aspect 81. The method of any one of aspects 78 to 80, wherein fusing filament intersections comprises applying heat and pressure to the filament intersections.

Aspect 82. The method of any one of aspects 78 to 81, wherein fusing filament intersections comprises depositing a composition to the filament intersections, wherein the composition comprises chopped fiber, milled fiber, or a combination thereof.

Aspect 83. A fiber-reinforced composite part fabricated according to the method of any one of aspects 78 to 82.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A method of fabricating a fiber-reinforced composite part, comprising:
(a) placing a plurality of filament subunits into a compression mold cavity in a predetermined configuration, wherein,
the mold cavity has substantially the shape of the fiber-reinforced composite part;
each of the filament subunits independently comprises a fiber bundle impregnated with a matrix material;
the plurality of fiber extends the length of the filament subunit;
each of the filament subunits is below a melt temperature of the matrix material;
at least one of the filament subunits is non-linear;
each of the filament subunits has a shape that conforms to a portion of the compression mold cavity; and each of the filament subunits is not in the form of a tape or sheet of material; and (b) consolidating the plurality of filament subunits in the mold cavity by compression molding to provide a fiber-reinforced composite part.

2. The method of claim 1, wherein each of the filament subunits is independently selected from a linear filament subunit, a shaped filament subunit, or a combination thereof.

3. The method of claim 1, wherein the plurality of filament subunits comprises a linear filament subunit.

4. The method of claim 1, wherein the plurality of filament subunits comprises a shaped filament subunit.

5. The method of claim 1, wherein the matrix material comprises a thermoplastic composition.

6. The method of claim 1, wherein the matrix material comprises a thermosetting composition.

7. The method of claim 1, wherein the matrix material comprises a moldable ceramic composition.

8. The method of claim 1, wherein the matrix material further comprises a filler.

9. The method of claim 8, wherein the filler comprises an inorganic filler, an organic filler, or a combination thereof.

10. The method of claim 1, wherein the plurality of fiber comprises silica fiber, glass fiber, carbon nanotubes, carbon fiber, polymer fiber, metal fiber, ceramic fiber, natural fiber, synthetic fiber, or a combination of any of the foregoing.

11. The method of claim 1, wherein the plurality of fiber comprises braided fiber, woven fiber, twisted fiber, or a combination of any of the foregoing.

12. The method of claim 1, wherein the plurality of fiber comprises co-aligned fiber.

13. The method of claim 1, wherein the plurality of fiber comprises non-aligned fiber, wherein the non-aligned fiber comprises chopped fiber, milled fiber, or a combination thereof.

14. The method of claim 1, wherein the plurality of fiber comprises a fiber bundle.

15. The method of claim 1, wherein the plurality of fiber comprises more than one fiber bundle.

16. The method of claim 1, wherein placing comprises placing a filament subunit onto an underlying filament subunit, adjacent a filament subunit, or a combination thereof.

17. The method of claim 1, further comprising placing a non-fiber filament subunit into the mold cavity.

18. The method of claim 1, further comprising placing a filament subunit comprising non-aligned fiber into the mold cavity, wherein the non-aligned fiber comprises chopped fiber, milled fiber, or a combination thereof.

19. The method of claim 1, further comprising placing pellets comprising the matrix material into the mold cavity.

20. The method of claim 19, wherein the pellets comprise fiber, filler, an additive, or a combination of any of the foregoing.

21. The method of claim 1, further comprising depositing chopped filament into the mold cavity.

22. The method of claim 1, further comprising depositing matrix material into the mold cavity.

23. The method of claim 1, wherein consolidating comprises heating the plurality of filament subunits above the melt temperature of the matrix material while applying pressure.

24. A method of fabricating an assembly layup, comprising:

(a) placing a plurality of filament subunits into a holding tray in a predetermined configuration, wherein,
  each of the filament subunits independently comprises a fiber bundle impregnated with a matrix material;
  the plurality of fiber extends the length of the filament subunit;
  each of the filament subunits is below a melt temperature of the matrix material;
  at least one of the filament subunits is non-linear;
  each of the filament subunits has a shape that conforms to a portion of the holding tray; and
  each of the filament subunits is not in the form of a tape or sheet of material; and (b) partially consolidating the plurality of filament subunits in the holding tray to provide an assembly layup;
wherein the assembly layup the holding tray has substantially the shape of a fiber-reinforced composite part.

25. A method of fabricating a fiber-reinforced composite part, comprising:
  transferring the assembly layup of claim 24 to a mold cavity; and
  consolidating the assembly layup by compression molding to form a fiber-reinforced composite part.

26. The method of claim 1, wherein placing comprises placing the plurality of filament subunits into the compression mold cavity using pick and place equipment.

27. The method of claim 1, further comprising shaping a filament subunit to provide the non-linear filament subunit.

28. The method of claim 1, wherein each of the filament subunits has a cross-sectional dimension in which the height is from 0.25 times to 6 times the width.

* * * * *